United States Patent
Ogiwara

(10) Patent No.: US 7,664,003 B2
(45) Date of Patent: Feb. 16, 2010

(54) OBJECTIVE LENS AND OPTICAL PICKUP APPARATUS

(75) Inventor: Kenji Ogiwara, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 686 days.

(21) Appl. No.: 11/168,919

(22) Filed: Jun. 29, 2005

(65) Prior Publication Data
US 2006/0002280 A1 Jan. 5, 2006

(30) Foreign Application Priority Data
Jul. 2, 2004 (JP) ............................ 2004-196881

(51) Int. Cl.
*G11B 7/00* (2006.01)
(52) U.S. Cl. ..................... 369/112.23; 369/112.24; 369/112.25; 369/112.26; 369/44.23
(58) Field of Classification Search ............ 369/112.01, 369/112.23, 112.25, 112.26, 44.23
See application file for complete search history.

(56) References Cited

U.S. PATENT DOCUMENTS

| | | | |
|---|---|---|---|
| 5,625,609 A * | 4/1997 | Latta et al. ............... | 369/44.23 |
| 6,118,594 A * | 9/2000 | Maruyama ................. | 359/719 |
| 2002/0009038 A1 * | 1/2002 | Kim ....................... | 369/112.23 |
| 2003/0234987 A1 | 12/2003 | Honda | |
| 2004/0047269 A1 | 3/2004 | Ikenaka et al. | |
| 2004/0264348 A1 * | 12/2004 | Mimori .................. | 369/112.05 |
| 2005/0047313 A1 * | 3/2005 | Saitoh et al. ........... | 369/112.05 |
| 2005/0265216 A1 * | 12/2005 | Hirai ...................... | 369/275.4 |
| 2005/0270925 A1 * | 12/2005 | Yamamoto et al. ....... | 369/44.37 |

FOREIGN PATENT DOCUMENTS

| | | | |
|---|---|---|---|
| EP | 1 304 689 A2 | 4/2003 | |
| EP | 1 372 147 A2 | 12/2003 | |
| EP | 1 385 159 A1 | 1/2004 | |
| EP | 1 416 480 A2 | 5/2004 | |
| JP | 2003303440 A * | 10/2003 | |
| WO | WO 2004/017306 A2 | 2/2004 | |

OTHER PUBLICATIONS

English translation Abstract of Shin et al. (JP 2003-303440A).*
European Search Report.

* cited by examiner

*Primary Examiner*—Wayne R Young
*Assistant Examiner*—LaTanya Bibbins
(74) *Attorney, Agent, or Firm*—Finnegan, Henderson, Farabow, Garrett & Dunner, L.L.P.

(57) ABSTRACT

An objective lens for use in an optical pickup apparatus for recording and/or reproducing information on a first optical information recording medium having a protective substrate with a thickness t1 using a light flux with a wavelength λ1, on a second optical information recording medium having a protective substrate with a thickness t2 using a light flux with a wave length λ2 and a third optical information recording medium having a protective substrate with a thickness t3 using a light flux with a wavelength λ2, the objective lens includes: an optical surface including a central area and a peripheral area, wherein when the objective optical lens forms the portion of the light flux with the wavelength λ2 passed the central area into a converged spot through a substrate with a thickness t4, the objective optical lens makes a spherical aberration of the converged spot a minimum value.

17 Claims, 18 Drawing Sheets

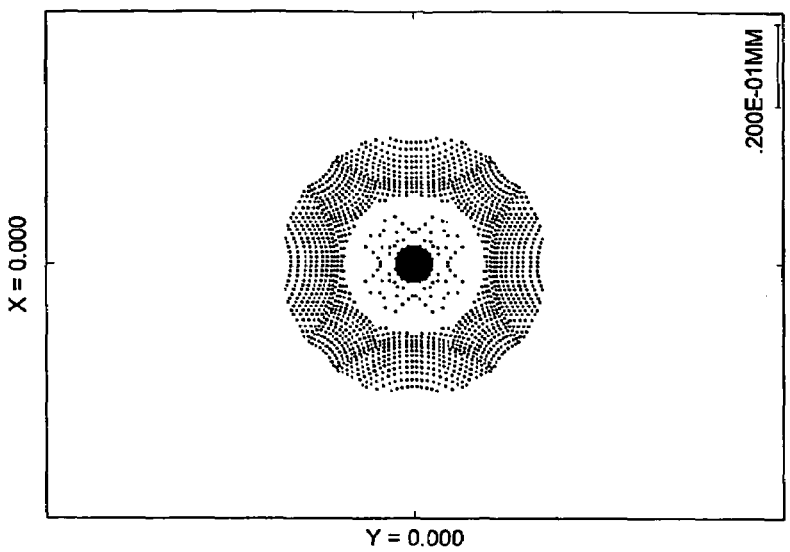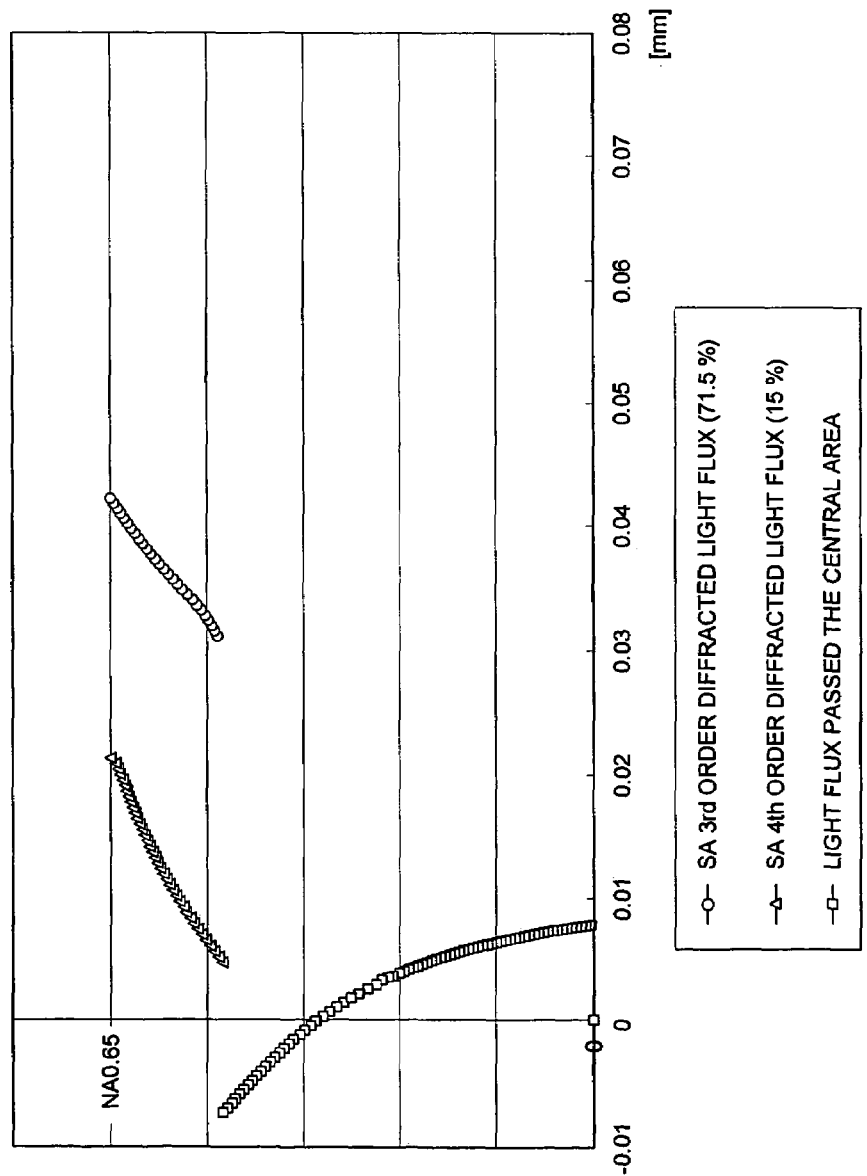
FIG. 7 (a)
FIG. 7 (b)

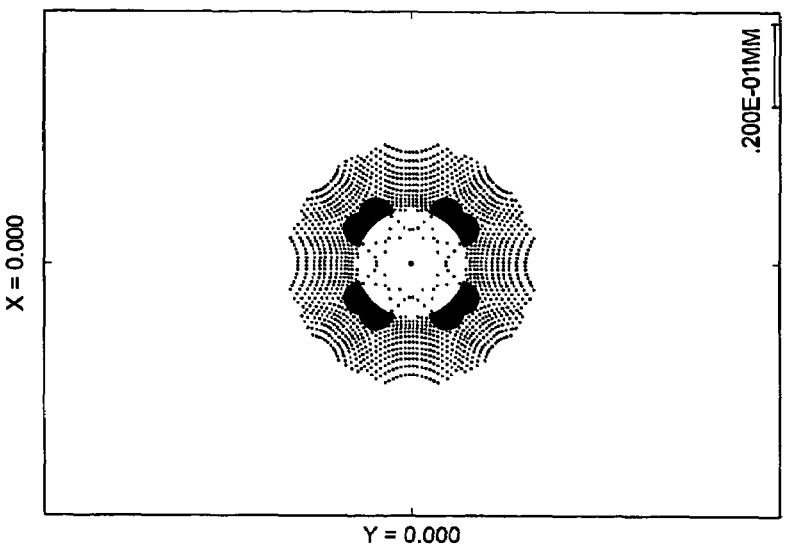
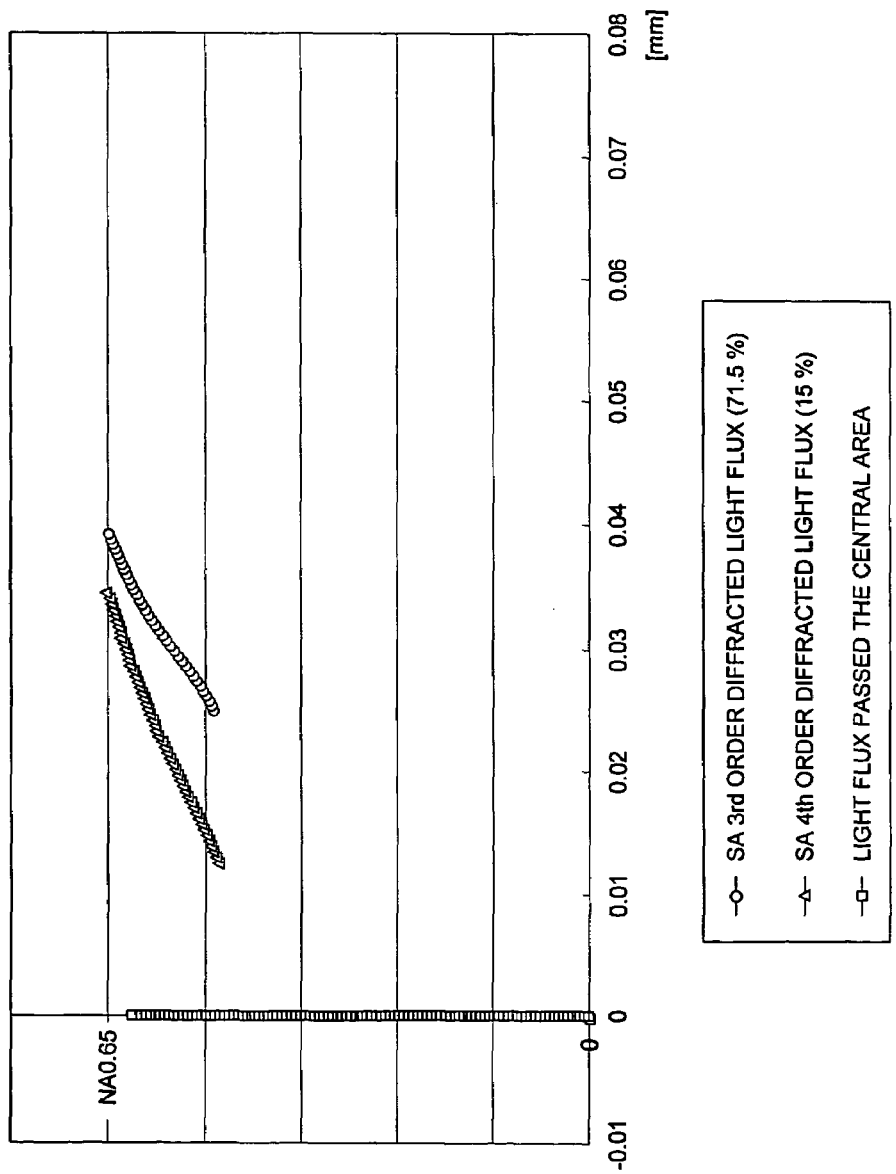
FIG. 9 (a)
FIG. 9 (b)

OBJECTIVE LENS AND OPTICAL PICKUP APPARATUS

This application is based on Japanese Patent Application No. 2004-196881 filed on Jul. 2, 2004 in Japanese Patent Office, the entire content of which is hereby incorporated by reference.

FIELD OF THE INVENTION

The present invention relates to an objective lens and an optical pickup apparatus provided with the objective lens.

BACKGROUND OF THE INVENTION

Presently, the optical disc (in other words, optical information disc) such as a DVD (Digital Versatile Disk) or CD (Compact Disc) is widely spread in the market.

Ordinary, DVD is in the range of protective substrate thickness is 0.6 mm, and the wavelength of the laser light is 635 nm-675 nm, and CD is in the range of protective substrate thickness is 1.2 mm, and the wavelength of the laser light is 765 nm-805 nm, however, there is a production error in the protective substrate thickness of these optical discs, and as an optical pickup apparatus to record or reproduce them, it is considered that it is more desirable that, even when there is more or less fluctuation in the protective substrate thickness of the optical disc, the apparatus can correspond enough to it.

Other than such a more or less fluctuation in the protective substrate thickness, in the case where it is intended that the production cost of the optical disc is more reduced, it is also considered in the future that the material consumption of the protective substrate is reduced by the means that the protective substrate thickness of, particularly, CD whose protective substrate is 1.2 mm and thick, is reduced as possible. Further, for example, there is a possibility that the optical disc in which the DVD and CD are integrated is assumed in the future, and it can also be assumed that, in that case, the protective substrate thickness of the CD is reduced (for example, the protective substrate thickness is about 0.9 mm) for suppressing the thickness of the optical disc. (Hereinafter, although the substantial standard is the same as an ordinal CD, the CD whose protective substrate thickness is about 0.9 mm and very thin, and which is out of the initial standard, is called herein as "new format optical disc").

In the future, in the case where it is assumed that this new format optical disc is spread in the market, the development of the compatible-use optical pickup apparatus by which the reproducing and/or recording can be conducted not only for the existing DVD or CD but also for the new format optical disc, is important, and particularly, one lens system optical pickup apparatus by which the compatibility is conducted by one objective lens is the most ideal mode.

In the optical pickup apparatus by which both of DVD and CD can be reproduced and/or recorded, at the time of reproducing/recording of CD, there is no necessity that the ray of light passing an area whose numerical aperture NA is larger than about 0.45 in the optical surfaces of the objective lens is used.

Accordingly, by using the diffractive structure formed on the optical surface of the objective lens, on the one hand that the laser light for CD passing the area whose numerical aperture NA is larger than about 0.45 is made so-called a flare light on the information recording surface of CD, a technology that the laser light for DVD is made converged with about no aberration on the information recording surface of DVD, is well known (for example, refer to Patent Document 1).

[Patent Document 1] Tokkai No. 2001-195769

Generally, when a light flux passes a diffractive structure, diffracted light fluxes with a plurality of diffraction orders are generated, and in these diffracted light fluxes, the recording and/or reproducing of the optical disc is conducted by using the diffracted light flux whose diffraction efficiency is the highest. However, there is a problem that the remaining diffracted light fluxes whose diffraction efficiencies are low and which are not used, (hereinafter, called as "unnecessary diffracted light fluxes") badly affect the operation of the optical pickup apparatus. Specifically, when a position at which the unnecessary diffracted light flux passes the objective lens and crosses the optical axis, and a position at which the usable diffracted light flux passes the objective lens and crosses the optical axis, are overlapped, the spot diameter of the converged spot is enlarged on the information recording surface of the optical disc, and there is a problem that apparent numerical aperture NA is lowered. Particularly, when the paraxial light-converging position of the unnecessary diffracted light flux is overlapped with the paraxial light-converging position of the usable diffracted light flux, the phases of both diffracted light fluxes coincide with each other at the converged spot, and the problem of the spot diameter enlargement is more conspicuous.

Further, when the position at which the unnecessary diffracted light flux passes the objective lens and crosses the optical axis is in close vicinity to the position at which the useable diffracted light flux passes the objective lens and crosses the optical axis, there is a case where the unnecessary diffracted light flux reflected on the information recording surface of the optical disc enters into a sensor for reflection light detection, noises are mixed in the RF signal, and the reading error of the recording and reproducing signal is generated. The RF signal is a signal used for the focus detection by the astigmatism method, and the returning characteristic from the sensor for the dislocation ($\Delta fB$) from the best focus position is shown. The focus detection is conducted by using the linearity of this RF signal.

Because an interval in the optical axis direction of the paraxial light-converging position of the diffracted light flux depends on the power of the diffraction, the chromatic aberration of the using laser light flux is influenced.

Further, the technology disclosed in Patent Document 1 is one for attaining the compatibility between two kinds of optical discs of DVD and CD, and not only DVD and CD, as the technology for attaining the compatibility among three kinds of optic al discs including the new format optical disc as described above, it is difficult that the technology disclosed in the Patent Document 1 is applied as it is.

SUMMARY OF THE INVENTION

A problem of the present invention is one for which the above-described problems are considered, and an object of the present invention is to provide an objective lens by which the compatibility among three kinds of optical discs of the new format optical disc whose protective substrate thickness is about 1.2 mm and for which the laser light with the wavelength about 785 nm is used, DVD and CD can be attained, and an optical pickup apparatus provided with this objective lens.

In order to solve the above problem, the structure written in item 1 is an objective lens used for an optical pickup apparatus for reproducing and/or recording information on the first optical information recording medium having a protective substrate with a thickness t1 by using a light flux with wavelength λ1, and for reproducing and/or recording information on the second optical information recording medium having a protective substrate with a thickness t2 (t1<t2) by using a light flux with wavelength λ2 (λ1<λ2), and for reproducing or recording information on the third optical information recording medium having a protective substrate with a thickness t3 (t2<t3) by using a light flux with wavelength λ2 (λ1<λ2). The objective lens is provided with an optical surface including a central area and a peripheral area arranged at an outside of the central area. The central area transmits a light flux with a wavelength λ2 used for reproducing or recording information on the second optical information recording medium or the third optical information recording medium. The peripheral area transmits a light flux with a wavelength λ2 not used for reproducing or recording information on the second optical information recording medium or the third optical information recording medium. The objective lens converges a light flux with a wavelength λ1 on an information recording surface of the first optical information recording medium, converges a light flux with a wavelength λ2 on an information recording surface of the second optical information recording medium, and converges a light flux with a wavelength λ2 on an information recording surface of the third optical information recording medium. When the objective optical lens forms the light flux with the wavelength λ2 passed the central area into a converged spot through a substrate with a thickness t4 (t2<t4<t3), the objective optical lens makes a spherical aberration of the converged spot a minimum value.

In the structure written in item 1, when the objective lens forms the light flux with the wavelength λ2 passed the central area into a converged spot through a substrate with a thickness t4 (t2<t4<t3) arranged in an optical system of the optical pickup apparatus, the objective lens is designed such that the objective lens makes a generated spherical aberration of the converged spot the minimum value on an information recording surface of the substrate. In other words, in the structure written in item 1, when the fourth optical information recording medium is virtually arranged in an optical system of the optical pickup apparatus and the objective lens forms the light flux with the wavelength λ2 passed the central area into a converged spot through a protective substrate with a thickness t4 (t2<t4<t3), the objective lens is designed such that the objective lens makes a generated spherical aberration of the converged spot the minimum value on an information recording surface of the protective substrate.

Generally, the light amount of the light flux necessary when the reproducing of the information is conducted on CD or new format optical disc may be smaller than that of DVD.

Accordingly, when the light flux with wavelength λ2 passed the central area of the objective lens is converged on the paraxial axis between the information recording surface of the second optical information recording medium having the protective substrate with the thickness of t2 (for example, the above-described new format optical disc), and the information recording surface of the third optical information recording medium having the protective substrate with the thickness of t3 (for example, CD), which is a position coinciding with a position on the information recording surface of the virtually positioned fourth optical information recording medium, the light flux with wavelength λ2 can be used for the reproducing of the information on both of the second optical information recording medium and the third optical information recording medium.

Hereupon, the objective lens in the present specification indicates the optical element having the light converging action, which is oppositely positioned to the optical information recording medium in the position closest to the optical information recording medium under the condition that the optical information recording medium is loaded into the optical pickup apparatus.

Further, the objective lens is not limited to a lens composed of a single lens, but it may also be the lens in which lens groups composed in such a manner that a plurality of lenses are structured in combination in the optical axis direction are collected.

Further, the optical information recording medium indicates a common optical disc on which the reproducing and/or recording of the information is conducted by using the light flux of the predetermined wavelength such as the new format optical disc, CD, DVD, CD-R, MD, MO, high density optical disc.

Further, the high density optical disc is a general name of optical discs for which the blue violet semiconductor laser or blue violet SHG laser is used as the light source for recording/reproducing of the information, and Blu-ray disc (hereinafter, written as BD) which uses the objective lens of NA-0.85, and whose protective layer thickness is 0.1 mm, or HD DVD (hereinafter, written as HD) which uses the objective lens of NA 0.65 to 0.67, and whose protective layer thickness is 0.6 mm, is also included. Further, other than the optical disc having such a protective layer on its information recording surface, the optical disc having the protective film of the thickness of several—several tens nm or the optical disc whose thickness of protective layer or protective film is 0, is also included. Further, in the present specification, in the high density optical disc, a photo-magnetic disc which uses the blue violet semiconductor laser or blue violet SHG laser as the light source for recording/reproducing of the information, is also included.

In the present specification, DVD is a general name of the optical discs of DVD series such as DVD-ROM, DVD-Video, DVD-Audio, DVD-RAM, DVD-R, DVD-RW, DVD+R, DVD+RW, and CD is a general name of optical discs of CD series such as CD-ROM, CD-Audio, CD-Video, CD-R, CD-RW.

Further, the new format optical disc is a general name of the optical discs which uses the same infrared semiconductor laser as CD, and indicates the optical disc of the standard in which the recording/reproducing of the information is conducted by the objective optical system of NA 0.45, and whose protective layer thickness is about 0.9 mm.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 7(a) is a vertical spherical aberration view and FIG. 7(b) is a spot diagram;

FIG. 9(*a*) is a vertical spherical aberration view and FIG. 9(*b*) is a spot diagram;

DETAILED DESCRIPTION OF THE INVENTION

Figure 1:
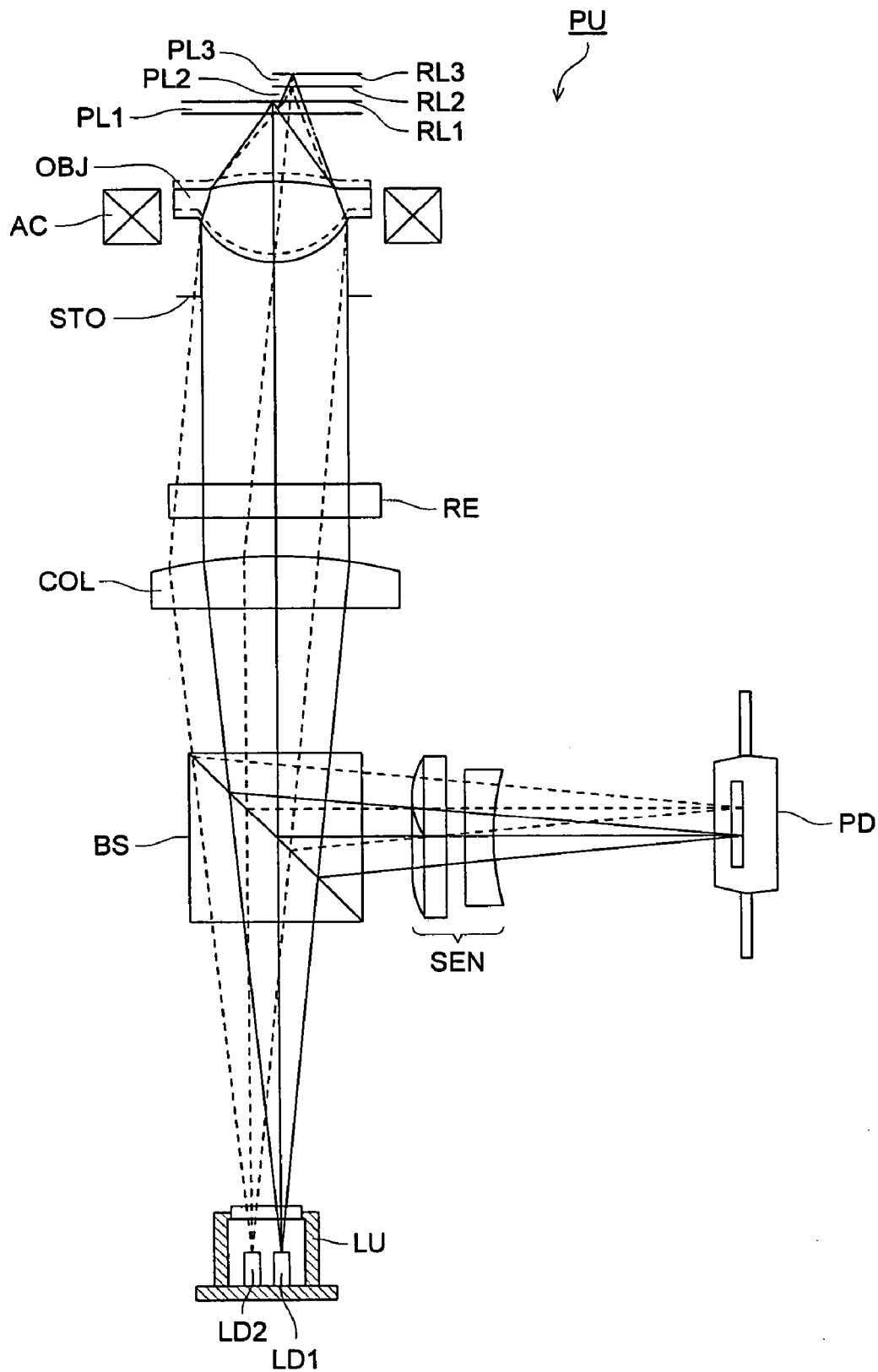
FIG. 1 is a plan view of main parts showing the structure of an optical pickup apparatus.

In the structure written in item 2, according to the objective lens written in item 1, the central area is provided with a first phase structure including a plurality of ring-shaped zones arranged concentrically around an optical axis and the peripheral area is provided with a second phase structure including a plurality of ring-shaped zones arranged concentrically around the optical axis.

In the structure written in item 3, according to the objective lens written in item 2, the first phase structure and the second phase structure are a first diffractive structure and a second diffractive structure, respectively, and the objective lens satisfies m≦n, where m is a diffraction order of a diffracted light flux having a maximum diffraction efficiency among diffracted light fluxes generated from a light flux with a wavelength λ2 passing through the first diffractive structure and n is a diffraction order of a diffracted light flux having a maximum diffraction efficiency among diffracted light fluxes generated from a light flux with a wavelength λ2 passing through the second diffractive structure. The central area and the peripheral area transmit a light flux with a wavelength λ1 and converges the light flux with the wavelength λ1 on the information recording surface of the first optical information recording medium with a wavefront aberration of 0.07 λ1 rms or less, the central area transmits a light flux with a wavelength λ2 and converges the light flux with the wavelength λ2 on the information recording surface of the second or third optical information recording media with a wavefront aberration of 0.07 λ2 rms or less, and the peripheral area transmits a light flux with a wavelength λ2 and makes a wavefront aberration of the light flux with the wavelength λ2 on the information recording surface of the second or third optical information recording media 0.15 λ2 rms or more and makes the wavefront aberration discontinuous in the vicinity of the border between the central area and the peripheral area.

In the present specification, the phase structure is a generic term referring to a structure, having steps in the direction of optical axis, for providing an optical path difference (phase difference) to the incoming light flux. The optical path difference provided by these steps can be integer times as large as the wavelength of the incoming light flux or a non-integer times as large as the wavelength of the incoming light flux. Specific examples of such a phase structure include a diffractive structure with the aforementioned step arranged at periodic intervals in the direction of optical axis, and an optical path difference providing structure (also called a phase difference assigning structure) with the aforementioned step arranged at aperiodic intervals in the direction of optical axis.

The structure written in item 4, according to the objective lens written in item 3, satisfies m<n.

In the structure written in item 3, when both of the light flux with wavelength λ1 passed the central area and the light flux with wavelength λ1 passed the peripheral area are converged on the information recording surface of the first optical information recording medium under the condition that the wave-front aberration is not larger than 0.07 (λ1 rms), a good converged spot is formed.

Further, when the m-th order diffracted light flux of the light flux with wavelength λ2 passed the central area is converged on the information recording surface of the second optical information recording medium and the information recording surface of the third optical information recording medium under the condition that the wave-front aberration is not larger than 0.07 (λ2 rms), a good converged spot is formed.

Further, when the n-th order (m≦n) diffracted light flux of the light flux with wavelength λ2 passed the peripheral area is made on the information recording surface of the second optical information recording medium and the information recording surface of the third optical information recording medium, so that the wave-front aberration is not smaller than 0.15 (λ2 rms) and the spherical aberration is discontinuous in the vicinity of the border between the central area and the peripheral area, and the n-th order diffracted light flux with wavelength λ2 is made so-called a flare light, it is not used for the reproducing of the information on the second optical information recording medium and the third optical information recording medium.

Further, as in the structure written in item 4, for the light flux with wavelength λ2, when the n-th order diffracted light flux of the light flux with wavelength λ2 passed the peripheral area of the objective lens and the m-th order diffracted light flux of the light flux with wavelength λ2 passed the central area of the objective lens satisfy m<n, it is preferable in the following points.

That is, for the purpose that the detection accuracy of the reflection light in the sensor of the optical pickup apparatus is increased, also when the gap (a discontinuous amount in the vicinity of the border between the central area and the peripheral area of the spherical aberration) of the light flux with wavelength λ2 flared when passed the peripheral area and the light flux with wavelength λ2 which forms the converged spot when passed the central area is assured, it can prevent the deterioration of the optical characteristic at the time of temperature change.

Hereupon, in the present specification, the "converged spot" indicates a spot formed by the defocus position at which the wave-front aberration of the converged by the objective lens is the minimum.

In the structure written in item 5, according to the objective lens written in any one of items 2-4, when p is a diffraction order of a diffracted light flux with a secondary highest diffraction efficiency next to the n order diffracted light flux among diffracted light fluxes generated from a light flux with a wavelength λ2 passing through the second diffractive structure, a diffraction efficiency in which the diffraction efficiency of the n order diffracted light flux and the diffraction efficiency of the p order diffracted light flux is 80% or more, and the objective lens converges the p order diffracted light flux on a paraxial position closer to a paraxial converging position on the information recording surface of the light flux with the wavelength λ2 passed the central area than a n-th order diffracted light flux.

In the structure written in item 5, when the diffractive action by the second diffractive structure is given to the light flux with wavelength λ2 which becomes flare light when passed the peripheral area, almost of the light amount is distributed to the n-th order diffracted light flux and the p-th order diffracted light flux. Then, the diffracted light flux whose light amount is smaller in these two diffracted light fluxes, that is, the p-th order diffracted light flux whose diffraction efficiency is smaller, is converged at the position close to the paraxial light-converging position on the information recording surface of the light flux with wavelength λ2 passed the central area. That is, the n-th order diffracted light flux whose diffraction efficiency is larger and the light amount is larger is shifted to the farther position separated from the converged spot than the p-th order diffracted light flux.

Hereby, even when the spherical aberration on the information recording surface of the light flux with wavelength λ2 passed the central area changes to the over correction side or under correction side, the separation of the flare light and the converged spot becomes easy, and for the new format optical disc, the detection accuracy of the reflection light by the sensor can be improved.

The structure written in item 6, according to the objective lens written in any one of items 1-5, satisfies following expressions:

$$0.60 \leq NA1 \leq 0.67$$

$$0.45 < NA2 \leq 0.55$$

where NA1 is a numerical aperture of image side of the objective lens which is necessary for information reproducing or recording on the first optical information recording medium, and NA2 is a numerical aperture of image side of the objective lens which is necessary for information reproducing or recording on the second optical information recording medium.

The structure written in item 7, according to the objective lens written in any one of items 1-6, satisfies following expressions:

$$\lambda 1 = 655 \pm 20 \text{ nm}$$

$$\lambda 2 = 785 \pm 20 \text{ nm}$$

$$0.5 \text{ mm} \leq t1 \leq 0.7 \text{ mm}$$

$$0.8 \text{ mm} \leq t2 \leq 1.05 \text{ mm}$$

$$1.05 \text{ mm} \leq t3 \leq 1.3 \text{ mm}$$

The structure written in item 8, according to the objective lens written in item 7, satisfies following expressions:

$$\lambda 1 < \lambda B1 < \lambda 2$$

$$\lambda B2 = \lambda 1$$

$$L1 = 1$$

$$3 \leq L2 \leq 5$$

where the first diffractive structure is optimized with a wavelength λB1 and diffraction order L1, and the second diffractive structure is optimized by a wavelength λB2 and diffraction order L2.

In the present specification, "the diffractive structure is optimized by λBn and the diffraction order Ln" means that, when the light flux with wavelength λBn transmits, the diffractive structure is structured so that the diffraction efficiency of the diffracted light flux of the diffraction order Ln is the maximum. Herein, n shows an arbitrary number.

In the structure written in item 9, according to the objective lens written in any one of items 1-8, when the optical pickup apparatus records and/or reproduces information on a fifth optical information recording medium having a protective substrate with a thickness t5 (t5≦t1) using a light flux with a wavelength λ5 (λ5<λ1), the objective lens converges a light flux with a wavelength λ5 on an information recording surface of the fifth optical information recording medium.

In the structure written in item 10, according to the objective lens written in item 9, the central area comprises a first phase structure including a plurality of ring-shaped zones arranged concentrically around an optical axis, the peripheral area comprises a second phase structure including a plurality of ring-shaped zones arranged concentrically around the optical axis.

In the structure written in item 11, according to the objective lens written in item 10, at least one of the first phase structure and the second phase structure is a diffractive structure.

In the structure written in item 12, according to the objective lens written in any one of items 9-11, the central area and the peripheral area transmit a light flux with a wavelength λ5 and converges the light flux with the wavelength λ5 on the information recording surface of the fifth optical information recording medium with a wavefront aberration of 0.07 λ1 rms or less. The central area and the peripheral area also transmit a light flux with a wavelength λ1 and converges the light flux with the wavelength λ1 on the information recording surface of the first optical information recording medium with a wavefront aberration of 0.07 λ1 rms or less. The central area also transmits a light flux with a wavelength λ2 and converges the light flux with the wavelength λ2 on the information recording surface of the second or third optical information recording media with a wavefront aberration of 0.07 λ2 rms or less. The peripheral area transmits a light flux with a wavelength λ2 and makes a wavefront aberration of the light flux with the wavelength λ2 on the information recording surface of the second or third optical information recording media 0.15 λ2 rms or more and makes the wavefront aberration discontinuous in the vicinity of the border between the central area and the peripheral area.

The structure written in item 13, according to the objective lens written in any one of item 9-12, satisfies following expressions:

$$0.60 \leq NA5 \leq 0.67$$

where NA5 is a numerical aperture of image side of the objective lens which is necessary for information reproducing or recording on the fifth optical information recording medium.

The structure written in item 14, according to the objective lens written in any one of items 9-13, satisfies following expressions:

$$\lambda 5 = 405 \pm 20 \text{ nm}$$

$$0.5 \text{ mm} \leq t5 \leq 0.7 \text{ mm}$$

The structure written in item 15, according to the objective lens written in any one of items 9-12, satisfies following expressions:

$$0.80 < NA5 \leq 0.99$$

where NA5 is a numerical aperture of image side of the objective lens which is necessary for information reproducing or recording on the fifth optical information recording medium.

The structure written in item 16, according to the objective lens written in any one of items 9-12 and 15, satisfies following expressions:

$$\lambda5 = 405 \pm 20 \text{ nm}$$

$$0.0 \text{ mm} \leq t5 \leq 0.3 \text{ mm}$$

The structure written in item 17, according to the objective lens written in any one of items 1-16, satisfies following expressions:

$$\frac{t2+t3}{2} - 0.2 < t4 < \frac{t2+t3}{2} + 0.1 \quad (1)$$

$$t3 - t2 < 0.5 \quad (2)$$

Under the condition that t4 exceeds the lower limit of the expression (1), when the light flux with the wavelength λ2 passes the substrate with thickness t3 after passing through the central area, the spherical aberration becomes discontinuous in the vicinity of the border between the central area and the peripheral area. Therefore, the structure can record and reproduce information using the light flux with the wavelength λ2 passed the central area without being affected by the light flux passed the peripheral area.

Under the condition that t4 becomes less than the upper limit of the expression (1), when the light flux with the wavelength λ2 passes the substrate with thickness t2 after passing through the central area, the spherical aberration becomes discontinuous in the vicinity of the border between the central area and the peripheral area. Therefore, the structure can record and reproduce information using the light flux with the wavelength λ2 passed the central area without being affected by the light flux passed the peripheral area.

Under the condition that t2 and t3 is in the range of the expression (1), in the substrate with thickness t2 or t3, the discontinuity of a spherical aberration of the light flux passed through the central area and a spherical aberration of the light flux passed through the peripheral area is kept. Therefore, the structure can record and reproduce information using the light flux with the wavelength λ2 passed the central area without being affected by the light flux with the wavelength λ2 passed the peripheral area.

A structure written in item 18, is an optical pickup apparatus including: a first light source for emitting a light flux with a wavelength λ1 recording and/or reproducing information on a first optical information recording medium having a protective substrate with a thickness t1; a second light source for emitting a light flux with a wavelength λ2 (λ1<λ2) recording and/or reproducing information on a second optical information recording medium having a protective substrate with a thickness t2 (t1<t2) and a third optical information recording medium having a protective substrate with a thickness t3; and the objective lens of any one of Items 1-17.

The structure written in item 18, according to the objective lens written in item 17, further includes a fifth light source for emitting a light flux with a wavelength λ5 (λ5≦λ1) recording and/or reproducing information on a second optical information recording medium having a protective substrate with a thickness t5 (t5≦t1).

According to the present invention, an objective lens by which the compatibility among 3 kinds of optical discs of the new format optical disc whose protective substrate thickness is about 1.2 mm and in which the wavelength of the laser light is about 785 nm, DVD and CD can be attained, and an optical pickup apparatus provided with this objective lens can be obtained.

According to the present invention, an objective lens by which the compatibility among 4 kinds of optical discs of the high density optical disc including HD and BD, the new format optical disc whose protective substrate thickness is about 1.2 mm and in which the wavelength of the laser light is about 785 nm, DVD and CD can be attained, and an optical pickup apparatus provided with this objective lens also can be obtained.

First Embodiment

Referring to the drawings, the best mode for carrying out the present invention will be detailed below.

FIG. 1 is a view roughly showing an optical pickup apparatus PU by which the recording/reproducing of the information can be adequately conducted also on any one of DVD (the first optical information recording medium), new format optical disc (the second optical information recording medium), and CD (the third optical information recording medium).

The optical specification of DVD is the wavelength λ1=655 nm, the thickness t1 of protective substrate PL1=0.60 mm, the numerical aperture NA1=0.60, the optical specification of the new format optical disc is the wavelength λ2=785 nm, the thickness t2 of protective substrate PL2=0.9 mm, the numerical aperture NA2=0.47, and the optical specification of CD is the wavelength λ2=785 nm, the thickness t3 of protective substrate PL3=1.2 mm, the numerical aperture NA2=0.47.

When the recording and/or reproducing of the information is conducted on DVD, new format optical disc, and CD, the magnification (magnification m1, m2 and m3) of the objective lens OBJ is m1=m2=m3=0, that is, it is structured in such a manner that the light fluxes of wavelengths λ1 and λ2 are incident on the objective lens together as parallel light.

Hereupon, it is preferable that the numerical apertures are within the range satisfying 0.60≦NA1≦0.67, 0.45≦NA2≦0.55, and within the range of λ1=655±20 nm, λ2=785±20 nm, 0.5≦t1≦0.7 mm, 0.8≦t2<1.05 mm, 1.05≦t3≦1.3 mm. However, the combination of the numerical aperture, wavelength, protective substrate thickness, and magnification is not limited to them.

The optical pickup apparatus PU is provided with: a light source unit LU which is integrated in the case where the red semiconductor laser LD1 (the first light source) projecting the laser light flux (the first light flux) of 655 nm which is light-emitted when the recording/reproducing of the information is conducted on DVD, and the infrared semiconductor laser LD2 (the second light source) projecting the laser light flux (the second light flux) of 785 nm which is light-emitted when the recording/reproducing of the information is conducted on the new format optical disc and CD, are housed in the same casing; objective lens OBJ on whose optical surface the diffractive structure DOE is formed, and whose both surfaces are aspheric surfaces having a function by which each light flux is converged on the information recording surfaces RL1, RL2, RL3; 2-axis actuator AC; stop STO corresponding to the numerical aperture NA1 of DVD; collimator lens COL; ¼ wavelength plate RE; beam splitter BS; sensor lens SEN; and photo-detector (sensor) PD.

In the optical pickup apparatus PU, when the recording/reproducing of the information is conducted on DVD, as its light-ray path is drawn by a solid line in FIG. 1, initially, the red semiconductor laser LD1 is light-emitted. The divergent light flux projected from the red semiconductor laser LD1 passes the beam splitter BS, and reaches the collimator lens COL.

Then, when it transmits the collimator lens COL, it is converted into the parallel light, and passes the ¼ wavelength plate RE and reaches the objective lens OBJ, and becomes a spot formed on the information recording surface RL1 through the first protective substrate PL1 by the objective lens OBJ. The objective lens OBJ conducts the focusing or tracking by the 2-axis actuator AC arranged in its periphery.

The reflection light flux modulated by the information pit on the information recording surface RL1 passes again the objective lens OBJ, ¼ wavelength plate RE, collimator lens COL, and branched by the beam splitter BS, and the astigmatism is added to it by the sensor lens SEN, and converged on the light receiving surface of the photo detector PD. Then, by using the output signal of the photo-detector PD, the information recorded in DVD can be read.

Further, when the recording/reproducing of the information is conducted on the new format optical disc, as its light-ray path is drawn by a dotted line in FIG. 1, initially, the infrared semiconductor laser LD2 is light-emitted. The divergent light flux projected from the infrared semiconductor laser LD2 passes the beam splitter BS, and reaches the collimator lens COL.

Then, when it transmits the collimator lens COL, it is converted into the parallel light, and passes the ¼ wavelength plate RE and reaches the objective lens OBJ, and becomes a spot formed on the information recording surface RL2 through the second protective substrate PL2 by the objective lens OBJ. The objective lens OBJ conducts the focusing or tracking by the 2-axis actuator AC arranged in its periphery.

The reflection light flux modulated by the information pit on the information recording surface RL2 passes again the objective lens OBJ, ¼ wavelength plate RE, collimator lens COL, and branched by the beam splitter BS, the astigmatism is added to it by the sensor lens SEN, and the light flux is converged on the light receiving surface of the photo-detector PD. Then, by using the output signal of the photo-detector PD, the information recorded in the new format optical disc can be read.

Further, when the recording/reproducing of the information is conducted on CD, in the same manner as when the recording/reproducing of the information is conducted on the new format optical disc, as its light-ray path is drawn by a dotted line and 2-dotted chain line in FIG. 1, initially, the infrared semiconductor laser LD2 is light-emitted. The divergent light flux projected from the infrared semiconductor laser LD2 passes the beam splitter BS, and reaches the collimator lens COL.

Then, when it transmits the collimator lens COL, it is converted into the parallel light, and passes the ¼ wavelength plate RE and reaches the objective lens OBJ, and becomes a spot formed on the information recording surface RL3 through the third protective substrate PL3 by the objective lens OBJ. The objective lens OBJ conducts the focusing or tracking by the 2-axis actuator AC arranged in its periphery.

The reflection light flux modulated by the information pit on the information recording surface RL3 passes again the objective lens OBJ, ¼ wavelength plate RE, collimator lens COL, and branched by the beam splitter BS, the astigmatism is added to it by the sensor lens SEN, and the light flux is converged on the light receiving surface of the photo-detector PD. Then, by using the output signal of the photo-detector PD, the information recorded in CD can be read.

Next, the composition of the optical lens OBJ will be described.

Figure 2:
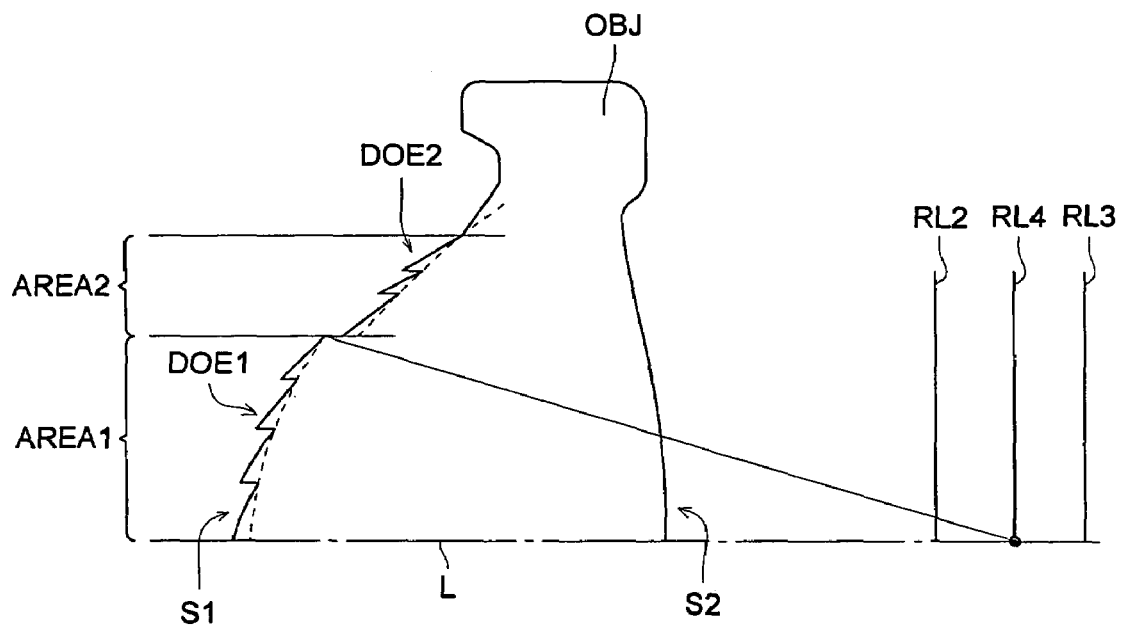
FIG. 2 is a sectional view of main parts showing the structure of an objective lens.

As shown in FIG. 2, the objective lens OBJ is a plastic single lens whose incident surface S1 (optical surface on the light source side) and whose projecting surface S2 (optical surface on the optical disc side) are composed of aspheric surfaces together.

Figure 3:
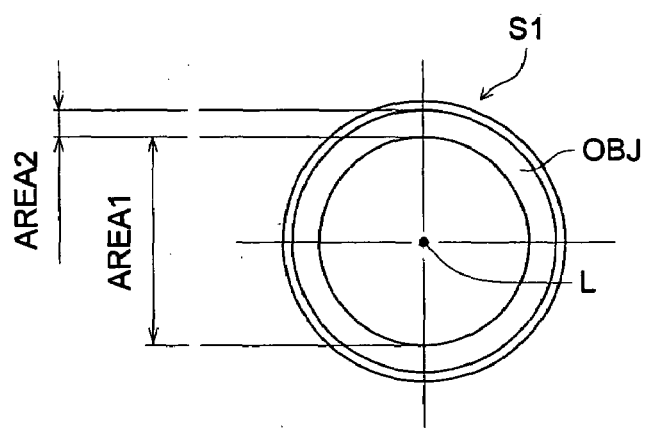
FIG. 3 is a front view showing the structure of an objective lens.

The optical surface S1 of the objective lens is, as shown in FIG. 3, divided into the central area AREA 1 which is a concentric circular area including the optical axis L, and the peripheral area AREA 2 which covers the periphery of the central area AREA 1.

The central area AREA 1 corresponds to an area through which the light flux used when the reproducing or recording is conducted on the new format optical disc and CD passes, and the peripheral area AREA 2 is an area positioned outside of the central area AREA 1, and corresponds to the area through which the light flux not used when the reproducing or recording is conducted on the new format optical disc and CD, in the light flux with wavelength λ2, passes.

The first diffractive structure DOE1 and the second diffractive structure DOE2 formed in the central area AREA1 and the peripheral area AREA2 are structured by a plurality of ring-shaped zones which are arranged concentrically around the optical axis L, and the diffractive action is given to the passing light flux by this ring-shaped zone.

Hereupon, for the shape of the ring-shaped zone and the design method, because they are commonly known, the description will be omitted, and when the first diffractive structure DOE1 formed in the central area AREA1 is optimized by the wavelength $\lambda B1$ and diffraction order L1, and the second diffractive structure DOE2 formed in the peripheral area AREA2 is optimized by the wavelength $\lambda B2$ and diffraction order L2, it is preferable that each diffractive structure is set so that $\lambda 1 < \lambda B1 < \lambda 2$, $\lambda B2 = \lambda B1$, $L1=1$, $3 \leq L2 \leq 5$ are satisfied.

Then, as shown in FIG. 2, the substrate with the thickness of t4 (t2<t4<t3) is virtually arranged in the optical system of the optical pickup apparatus PU, and it is set so that the spherical aberration generated on the information recording surface RL4 by the light flux with wavelength λ2 passed the central area AREA1 of the objective lens OBJ, that is, the spherical aberration of the converged spot formed when through the substrate of the thickness t4 (t2<t4<t3) is the minimum when through the protective substrate of protective substrate thickness t4 (t2<t4<t3.)

Hereupon, it is preferable that t4 is within the range of 0.95 mm≦t4≦1.05 mm.

In this manner, when the light flux with wavelength λ2 passed the central area AREA1 is converged on the paraxial axis between the information recording surface RL2 of the new format optical disc and the information recording surface RL3 of CD, which is the position coinciding with an position on the information recording surface RL4 of the virtually arranged the substrate, the light flux with wavelength λ2 can be used for the reproducing of the information on both of the news format optical disc and CD.

Further, in the case where the diffraction order of the diffracted light flux having the maximum diffraction efficiency in the diffracted light fluxes generated when the light flux with wavelength λ2 passes the first diffractive structure DOE1 is m, and the diffraction order of the diffracted light flux having the maximum diffraction efficiency in the diffracted light fluxes generated when the light flux with wavelength λ2 passes the second diffractive structure DOE2 is n, it is set so as to satisfy m≦n.

Further, when it is set in such a manner that the light flux with wavelength λ2 passed the central area AREA1 is converged on the information recording surface of the new format optical disc and the information recording surface of CD so that the wave-front aberration is not larger than 0.07 (λ2 rms), and the light flux with wavelength λ2 passed the peripheral area AREA2 is converged on the information recording surface of the new format optical disc and the information recording surface of CD so that the wave-front aberration is not smaller than 0.15 (λ2 rms), and the spherical aberration is discontinuous in the vicinity of the border between the central area AREA1 and the peripheral area AREA2, it is set so that the n-th order diffracted light flux of the light flux with wavelength λ2 passed the peripheral area AREA2 is flared, and is not used for reproducing of the information on the new format optical disc and CD.

In this manner, when, for the light flux with wavelength λ2, the diffraction order of the light flux passed the peripheral area AREA2 of the objective lens is made higher than the diffraction order of the light flux passed the central area AREA1, that is, made so-called the peripheral high-order diffraction, the following effects are obtained.

That is, in order to improve the detection accuracy of the reflection light in the photo-detector PD of the optical pickup apparatus PU, also by a method in which a gap between the light flux with wavelength λ2 flared when passed the peripheral area AREA2, and the light flux with wavelength λ2 which forms a converged spot when passed the central area AREA1, (the discontinuous amount of the spherical aberration in the vicinity of the border between the central area AREA1 and the peripheral area AREA2) is secured, the prevention of deterioration of the optical characteristic at the time of temperature change becomes possible.

Further, it is set in such a manner that the light flux with wavelength λ1 passed the central area AREA1 and the peripheral area AREA2 is converged on the information recording surface of DVD so that the wave-front aberration is not larger than 0.07 (λ1 rms). Hereby, it is set so that the compatibility among the new format optical disc, DVD and CD can be attained.

Further, in order to improve the detection accuracy in the photo-detector PD of the reflection light of the light flux with wavelength λ2, in a plurality of diffracted light fluxes generated by receiving the diffractive action from the second diffractive structure DOE2 when the light flux with wavelength λ2 passes the peripheral area AREA2, when the diffraction order of the diffracted light flux whose diffraction efficiency is high next to the diffraction efficiency of n-th order diffracted light flux is assumed p, it is preferable that it is set so that the diffraction efficiency in which the diffraction efficiency of n-th order diffracted light flux and the diffraction efficiency of p-th order diffracted light flux are added together, is not smaller than 80%, and is set so that, the p-th order diffracted light flux is converged on a paraxial position closer to the paraxial converging position on each information recording surface of the second light flux passed the central area AREA1, than a n-th order diffracted light flux.

When the diffraction efficiency in which the diffraction efficiency of the n-th order diffracted light flux and the diffraction efficiency of the p-th order diffracted light flux are added, is not smaller than 80%, almost of the light amount of the light flux with wavelength λ2 can be distributed to the n-th order diffracted light flux and the p-th order diffracted light flux. Then, the diffracted light flux whose light amount is smaller in these 2 diffracted light fluxes, that is, the p-th order diffracted light flux whose diffraction efficiency is smaller, is converged at a position closer to the paraxial light-converging position on each information recording surface of the light flux with wavelength λ2 passed the central area AREA1. That is, it is structured in such a manner that the n-th order diffracted light flux whose diffraction efficiency is larger, and whose light amount is larger, is shifted to the position more separated from the converged spot than the p-th order diffracted light flux.

Hereby, even when the spherical aberration on the information recording surface of the light flux with wavelength λ2 passed the central area AREA1 which is used for the reproducing of the information, is changed to over (excess) or under (insufficient) side, the state that the paraxial converging position of the n-th order diffracted light flux whose diffraction efficiency is higher in the unnecessary lights which are not used for the reproducing of the information is separated from the converged spot, can be formed, and the enlargement of the spot diameter of the converged spot can be prevented, the separation of the flare light from the converged spot becomes easy, and for the new format optical disc, the detection accuracy of the reflection light by the sensor can be improved.

Hereupon, in the embodiment according to the present invention, it is not a necessary condition that the diffractive structure is provided in the objective lens OBJ, however, when the diffractive structure is provided, it may be provided on either one of the incident surface S1 or the projecting surface S2 of the objective lens, or on both surfaces.

Further, in the present embodiment, the optical pickup apparatus PU has the compatibility among 3 kinds of optical information recording media of DVD as the first optical information recording medium, new format optical disc as the second optical information recording medium, and CD as the third optical information recording medium, however, not limited to this, for example, in order to attain the compatibility among 3 kinds of optical discs of BD as the first optical information recording medium, HD as the second optical information recording medium, and DVD or CD as the third optical information recording medium, the technology according to the present invention may also be applied.

Example 1

Next, Example 1 will be described.

In the present Example, the incident surface and the projecting surface of the objective lens are respectively aspheric surface, and the incident surface is divided into the central area of $0 \leq h < 1.095$ mm, and the peripheral area of $h \geq 1.095$ mm, and on the incident surface, a plurality of diffractive ring-shaped zones which are saw-toothed around the optical axis as the diffractive structure, are formed.

Lens data of the objective lens is shown in Table 1.

TABLE 1

| (Example 1) | | | | | |
|---|---|---|---|---|---|
| Focal distance | | $f_1$ = 2.330 mm, | | $f_2$ = 2.346 mm | |
| Numerical aperture | | NA1 = 0.65 | | NA2 = 0.47 | |
| Image formation magnification | | m = 0.0 | | m = 0.0 | |
| i-th surface | Ri | di (655 nm) | ni (655 nm) | di (785 nm) | ni (785 nm) | |
| 0 | ∞ | | ∞ | | | |
| 1 | ∞ | 0.00000 | 1.00000 | 0.00000 | 1.00000 | *3 |
| 2 | 1.32147 | 1.20000 | 1.52915 | 1.20000 | 1.52541 | *1 |
| 2' | 1.41766 | −0.00841 | — | −0.00841 | — | *1 |
| 3 | −6.68889 | 1.26716 | — | 1.02525 | — | *2 |

TABLE 1-continued

| 4 | ∞ | 0.60000 | 1.57752 | 1.00000 | 1.57063 |
| 5 | ∞ | | | | |

*di: the dislocation on the optical axis from the i-th surface to the (i + 1)th surface
*d2': the dislocation on the optical axis from the 2nd surface to the 2'nd surface
*1: aspheric surface and diffractive surface
*2: aspheric surface
*3: stop diameter 2.76 mm Aspheric surface and diffractive surface data
The 2nd surface (0 ≦ h < 1.095 mm)

| Apheric surface coefficient | |
| --- | --- |
| κ | −1.1991E+00 |
| A4 | +1.9562E−02 |
| A6 | +3.3287E−03 |
| A8 | −3.3235E−03 |
| A10 | +5.3515E−04 |
| A12 | +2.6330E−04 |
| Coefficient of the optical path difference function (reference wavelength 720 nm) | |
| B2 | 0.0000 |
| B4 | −4.5076E−03 |
| B6 | +1.7285E−03 |
| B8 | −2.3737E−03 |
| B10 | +7.7854E−04 |

Optimized by the 1$^{st}$ diffraction order
The 2'nd surface (1.095 mm ≦ h)

| Aspheric surface coefficient | |
| --- | --- |
| κ | −1.1851E+00 |
| A4 | +1.2182E−02 |
| A6 | −1.4272E−02 |
| A8 | +1.6526E−02 |
| A10 | −4.1125E−03 |
| Coefficient of the optical path difference function (reference wavelength 655 nm) | |
| B2 | +6.0423E−03 |
| B4 | −1.2050E−02 |
| B6 | +6.0970E−03 |
| B8 | −1.2847E−03 |
| B10 | +1.0505E−04 |

Optimized by the 1$^{st}$ diffraction order
The 3rd surface (0 ≦ h < 1.016 mm)
Apheric surface coefficient

| κ | −3.4356E+00 |
| --- | --- |
| A4 | +1.6766E−02 |
| A6 | −2.3956E−03 |
| A8 | −6.3964E−03 |
| A10 | +1.3290E−02 |
| A12 | −1.1787E−02 |
| A14 | +4.6545E−03 |
| A16 | −6.9227E−04 |

As shown in Table 1, the optical pickup apparatus of the present example is set to the focal distance $f_1$=2.330 mm when the wavelength projected from the first light source is λ1=655 nm, image side numerical aperture NA1=0.65, image formation magnification m=0.0, and the focal distance $f_2$=2.346 mm when the wavelength projected from the second light source is λ2=785 nm, image side numerical aperture NA2=0.47, image formation magnification m=0.0.

The surface Nos. 2 and 2' in Table 1 indicates the central area AREA1 and the peripheral area AREA2 of the incident surface of the objective lens, and the surface No. 3 indicates the projecting surface of the objective lens. Further, Ri expresses the radius of curvature, di expresses a position in the optical axis direction from the i-th surface to (i+1)−th surface, ni expresses the refractive index of each surface.

The 2nd surface, 2'nd surface, third surface are respectively formed into the aspheric surface which is axially symmetric around the optical axis 1, regulated by the equation in which coefficients shown in Table 1 are substituted into the following equation (Eq-1).

(Eq-1)
Aspheric Surface Shape Equation $$X(h) = \frac{(h^2/R)}{1 + \sqrt{1-(1+\kappa)(h/R)^2}} + \sum_{i=0}^{9} A_{2i} h^{2i}$$

Herein, X(h) is an axis in the optical axis direction (traveling direction of the light is positive), κ is a conical coefficient, and $A_{2i}$ is an aspheric surface coefficient.

Further, on the 2nd surface and 2'nd surface, the first diffractive structure and the second diffractive structure are formed. This diffractive structure is expressed by the optical path difference added to the transmission wave-front by this structure. Such an optical path difference is, when h (mm) is a height in the direction perpendicular to the optical axis, and $B_{2i}$ is an optical path difference function coefficient, expressed by the optical path difference function Φ(h) (mm) defined by substituting coefficients shown in Table 1 into the following Eq-2.

(Eq-2)
Optical Path Difference Function $$\Phi(h) = \sum_{i=0}^{5} B_{2i} h^{2i}$$

Hereupon, the first diffractive structure of the central area is formed into the structure in which the blaze wavelength (reference wavelength) is 720 nm, and which is optimized so that the diffraction order of the diffracted light flux having the maximum diffraction efficiency in the diffracted light fluxes of the incident light flux of this wavelength 720 nm, is 1st order, that is, optimized by the diffraction order of 1st order.

Further, the second diffractive structure of the peripheral area is formed into the structure in which the blaze wavelength (reference wavelength) is 655 nm, and which is optimized so that the diffraction order of the diffracted light flux having the maximum diffraction efficiency in the diffracted light fluxes of the incident light flux of this wavelength 655 nm, is 1st order, that is, optimized by the diffraction order of 1st order.

In the present Example, the substrate with the thickness of 1.0 mm (r4=1.0 mm) is virtually arranged, and the objective lens is designed so that the spherical aberration of the converged light flux becomes minimum on the information recording surface of the substrate when the light flux with wavelength λ2 passed the central area of the objective lens, is converged on the paraxial axis between the information recording surface RL2 of the new format optical disc (protective substrate thickness t2=0.9 mm) and the information recording surface RL3 of CD (protective substrate thickness t3=1.2 mm).

Figure 4:
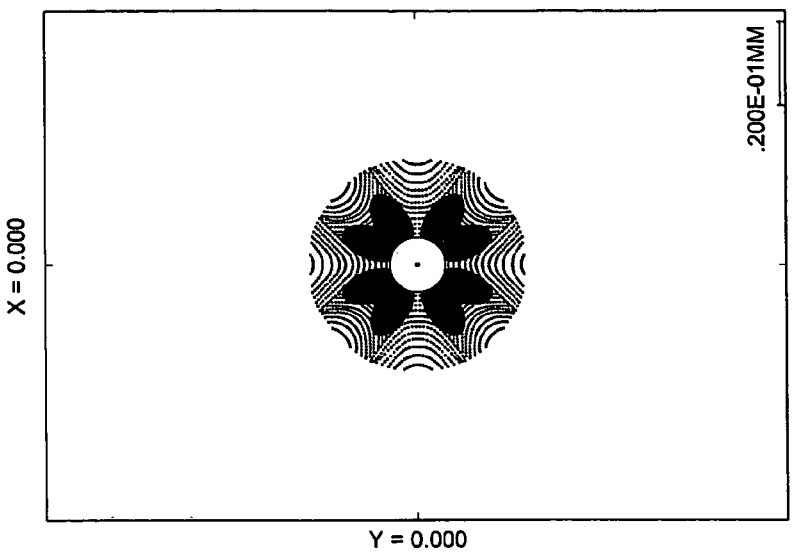
FIG. 4(a) is a vertical spherical aberration view and FIG. 4(b) is a spot diagram.
Figure 4:
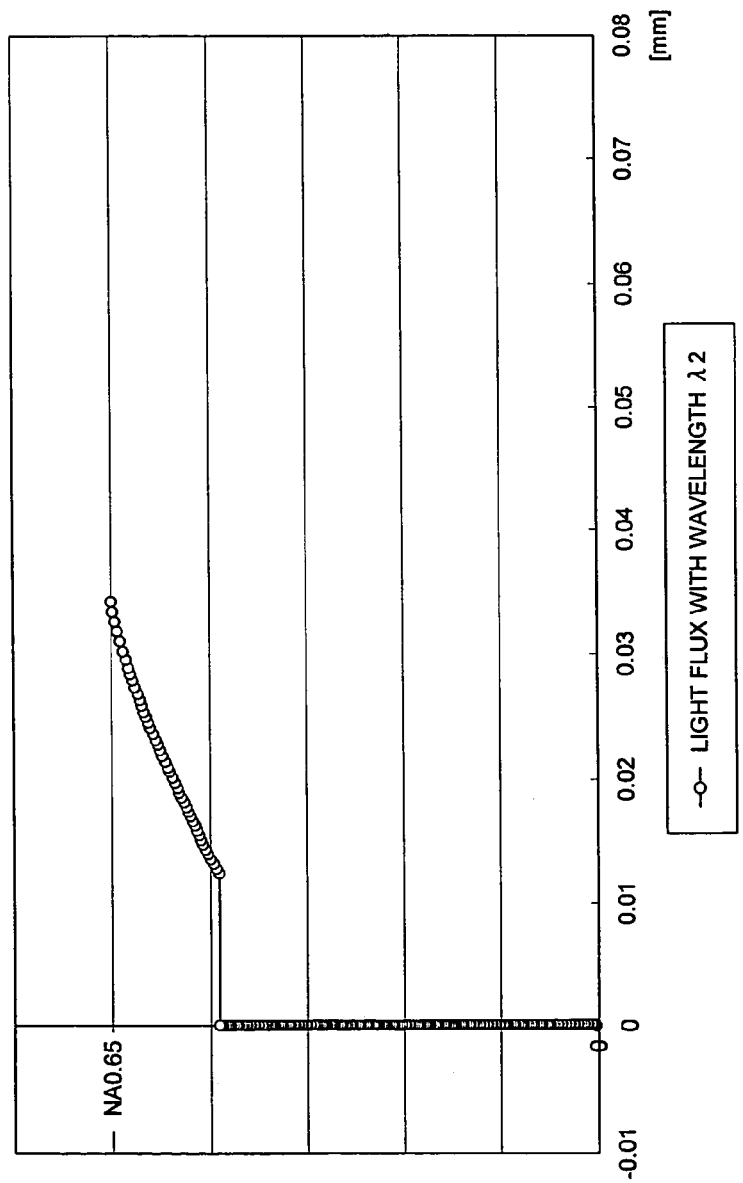

FIG. 4(*a*) is a vertical spherical aberration view on the information recording surface of the virtually arranged fourth optical information recording medium (vertical axis expresses the numerical aperture, and the horizontal axis expresses the distance (mm) on the optical axis, this is the same in the following vertical spherical aberration views), and FIG. 4(b) is a spot diagram.

From FIGS. 4(a) and 4(b), it is seen that the spherical aberration is suppressed to almost 0 within the range of effective diameter, and the flare light generated outside the effective diameter, and the converged spot are separated enough.

Figure 5:
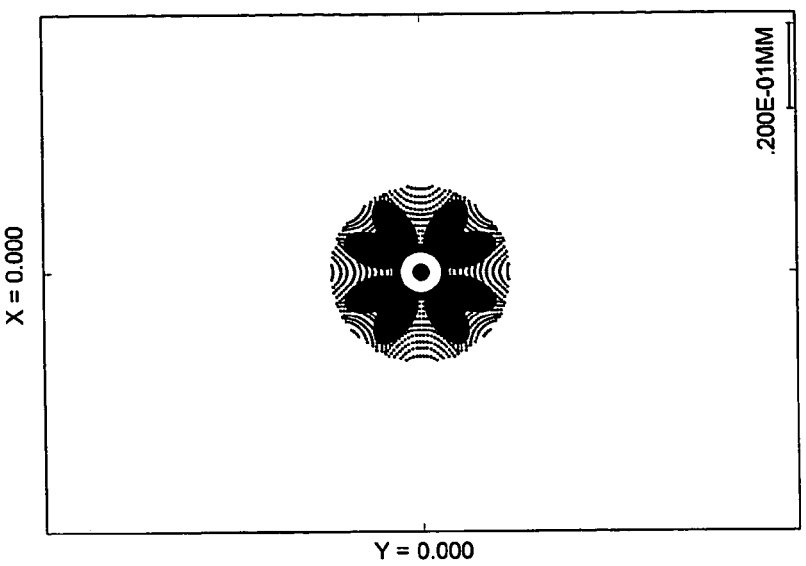
FIG. 5(a) is a vertical spherical aberration view and FIG. 5(b) is a spot diagram.
Figure 5:
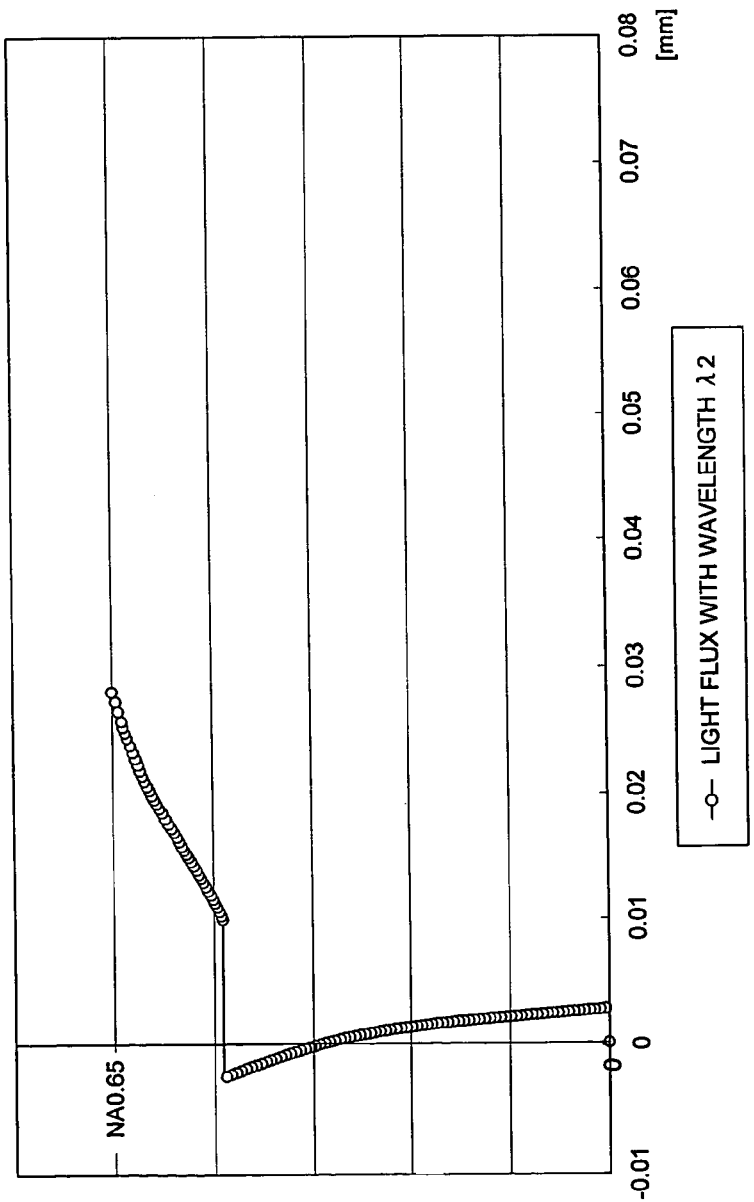

FIG. 5(a) is a vertical spherical aberration view on the information recording surface of the new format optical disc when using an objective lens which is set in such a manner, and FIG. 5(b) is a spot diagram. It is seen from FIG. 5 that the generation amount of the spherical aberration within the range of effective diameter is suppressed to a degree which is practically no hindrance, and the flare light generated outside the effective diameter and the converged spot are separated enough.

Figure 6:
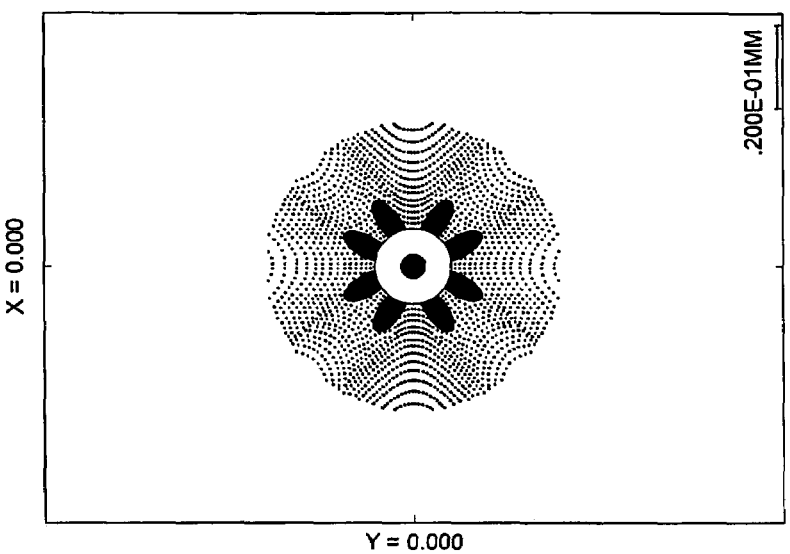
FIG. 6(a) is a vertical spherical aberration and FIG. 6(b) is a spot diagram view.
Figure 6:
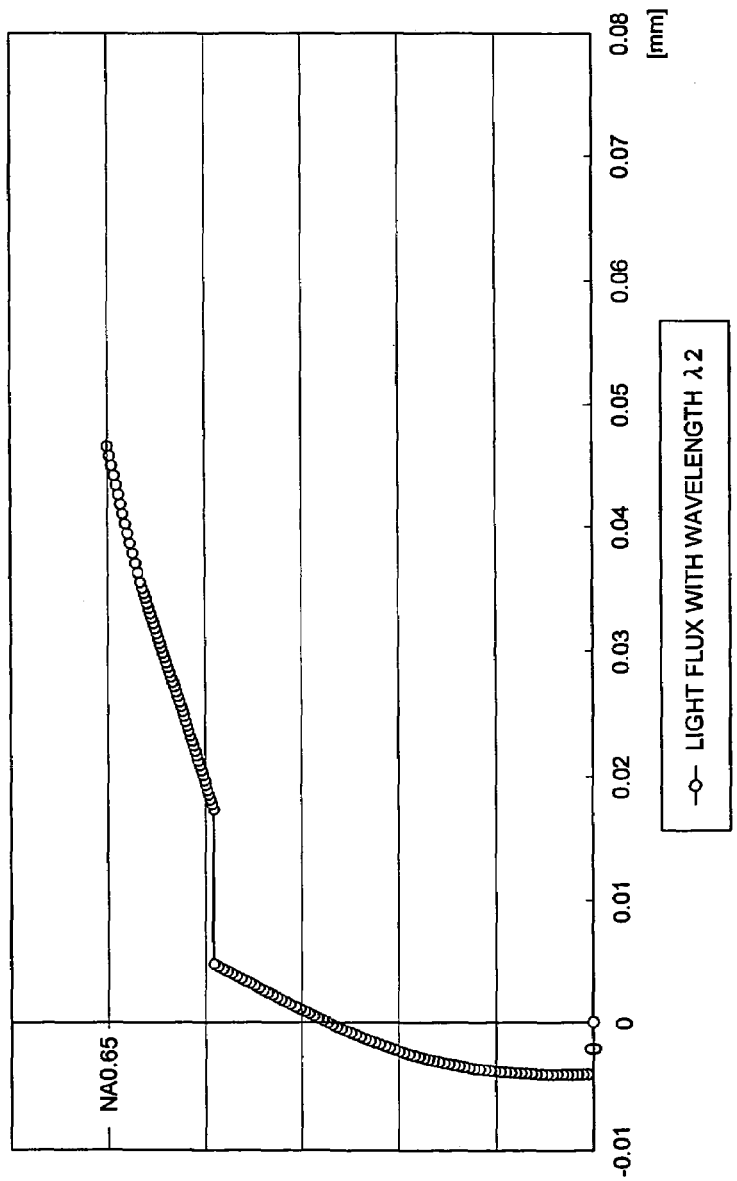

FIG. 6(a) is a vertical spherical aberration view on the information recording surface of the optical disc of CD when using the objective lens which is set in such a manner, and FIG. 6(b) is a spot diagram. It is seen from FIG. 6 that the generation amount of the spherical aberration within the range of effective diameter is suppressed to a degree which is practically no hindrance, and the flare light generated outside the effective diameter and the converged spot are separated enough.

Example 2

Next, Example 2 will be described.

In the present Example, the incident surface and the projecting surface of the objective lens are respectively aspheric surface-shaped, and the incident surface is divided into the central area of $0 \leq h < 1.095$ mm, and the peripheral area of $h \geq 1.095$ mm, and on the incident surface, a plurality of diffractive ring-shaped zones which are saw-toothed around the optical axis as the diffractive structure, are formed.

Lens data of the objective lens is shown in Table 2.

TABLE 2

(Example 2)

| Focal distance | $f_1$ = 2.330 mm, | $f_2$ = 2.346 mm |
| --- | --- | --- |
| Numerical aperture | NA1 = 0.65 | NA2 = 0.47 |
| Image formation magnification | m = 0.0 | m = 0.0 |

| i-th surface | Ri | di (655 nm) | ni (655 nm) | di (785 nm) | ni (785 nm) | |
| --- | --- | --- | --- | --- | --- | --- |
| 0 | ∞ | 0.00000 | | 0.00000 | | |
| 1 | ∞ | 0.00000 | 1.00000 | 0.00000 | 1.00000 | *3 |
| 2 | 1.33904 | 1.20000 | 1.52915 | 1.20000 | 1.52541 | *1 |
| 2' | 1.41358 | −0.00688 | — | −0.00688 | — | *1 |
| 3 | −6.81272 | 1.26519 | — | 0.89598 | — | *2 |
| 4 | ∞ | 0.60000 | 1.57752 | 1.20000 | 1.57063 | |
| 5 | ∞ | | | | | |

*di: the dislocation on the optical axis from the i-th surface to the (i + 1)th surface
*d2': the dislocation on the optical axis from the 2nd surface to the 2'nd surface
*1: aspheric surface and diffractive surface
*2: aspheric surface
*3: stop diameter 2.76 mm Aspheric surface and diffractive surface data
The 2th surface ($0 \leq h < 1.095$ mm)

Apheric surface coefficient

| κ | −1.2198E+00 |
| --- | --- |
| A4 | +1.8791E−02 |
| A6 | +2.9538E−03 |

TABLE 2-continued

| A8 | −3.4720E−03 |
| --- | --- |
| A10 | +7.3891E−04 |
| A12 | +1.6673E−04 |

Coefficient of the optical path difference function
(reference wavelength 720 nm)

| B2 | 0.0000 |
| --- | --- |
| B4 | −6.0903E−03 |
| B6 | +1.4774E−03 |
| B8 | −2.4824E−03 |
| B10 | +8.0039E−04 |

Optimized by the $1^{st}$ diffraction order
The 2'nd surface (1.095 mm ≤ h)

Aspheric surface coefficient

| κ | −1.1955E+00 |
| --- | --- |
| A4 | +1.1942E−02 |
| A6 | −1.4109E−02 |
| A8 | +1.6528E−02 |
| A10 | −4.1197E−03 |

Coefficient of the optical path difference function
(reference wavelength 655 nm)

| B2 | +1.0615E−03 |
| --- | --- |
| B4 | −3.2446E−03 |
| B6 | +1.4537E−03 |
| B8 | −3.3123E−04 |
| B10 | +3.9318E−05 |

Optimized by the $4^{th}$ diffraction order
The 3rd surface ($0 \leq h < 1.016$ mm)
Apheric surface coefficient

| κ | −6.9739E+00 |
| --- | --- |
| A4 | +1.7840E−02 |
| A6 | −2.2970E−03 |
| A8 | −6.4853E−03 |
| A10 | +1.3216E−02 |
| A12 | −1.1833E−02 |
| A14 | +4.6468E−03 |
| A16 | −6.7977E−04 |

As shown in Table 2, the optical pickup apparatus of the present example is set to the focal distance $f_1$=2.330 mm when the wavelength projected from the first light source is λ1=655 nm, image side numerical aperture NA1=0.65, image formation magnification m=0.0, and the focal distance $f_2$=2.346 mm when the wavelength projected from the second light source is λ2=785 nm, image side numerical aperture NA2=0.47, image formation magnification m=0.0.

The surface Nos. 2 and 2' in Table 2 indicates the central area AREA1 and the peripheral area AREA2 of the incident surface of the objective lens, and the surface No. 3 indicates the projecting surface of the objective lens. Further, Ri expresses the radius of curvature, di expresses a position in the optical axis 1 direction from the i-th surface to (i+1)-th surface, ni expresses the refractive index of each surface.

The 2nd surface, 2nd surface, third surface are respectively formed into the aspheric surface which is axially symmetric around the optical axis 1, regulated by the equation in which coefficients shown in Table 2 are substituted into the above-described equation (Eq-1).

Further, on the 2nd surface and 2'nd surface, the first diffractive structure and the second diffractive structure are formed. This diffractive structure is expressed by the optical path difference added to the transmission wavefront by this structure. Such an optical path difference is, when h (mm) is a height in the direction perpendicular to the optical axis, and $B_{2i}$ is an optical path difference function coefficient, expressed by the optical path difference function Φ(h) (mm) defined by substituting coefficients shown in Table 2 into the above-described Eq-2.

Hereupon, the first diffractive structure of the central area is formed into the structure in which the blaze wavelength (reference wavelength) is 720 nm, and which is optimized so that the diffraction order of the diffracted light flux having the maximum diffraction efficiency in the diffracted light fluxes of the incident light flux of this wavelength 720 nm, is 1st order, that is, optimized by the diffraction order of 1st order.

Further, the second diffractive structure of the peripheral area is formed into the structure in which the blaze wavelength (reference wavelength) is 655 nm, and which is optimized so that the diffraction order of the diffracted light flux having the maximum diffraction efficiency in the diffracted light fluxes of the incident light flux of this wavelength 655 nm, is 4th order, that is, optimized by the diffraction order of 4th order.

Further, in the present example, it is regulated that the diffraction order of the diffracted light flux having the maximum diffraction efficiency in the diffracted light fluxes generated by receiving the diffractive action from the diffractive structure when the light flux with wavelength λ2 passes the central area, is 1 (m=1), and the diffraction order of the diffracted light flux having the maximum diffraction efficiency in the diffracted light fluxes generated by receiving the diffractive action from the diffractive structure when the light flux with wavelength λ2 passes the peripheral area, is 3 (n=3), and it is set so as to satisfy m≦n.

Figure 8:
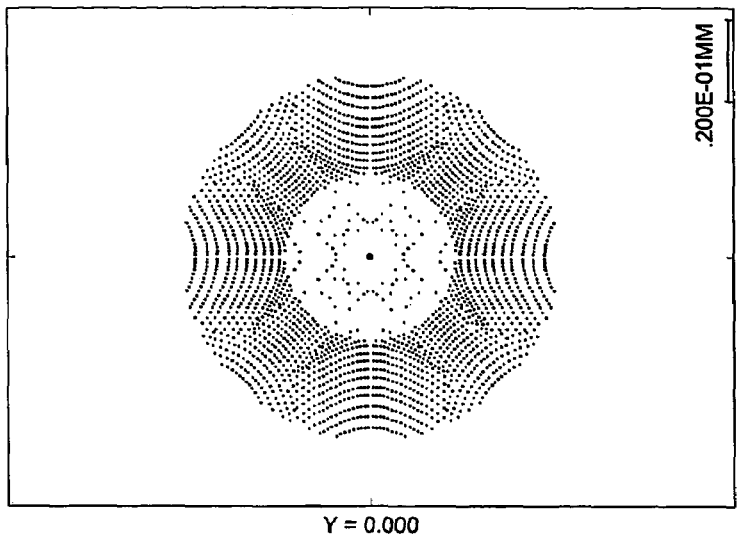
FIG. 8(a) is a vertical spherical aberration view and FIG. 8(b) is a spot diagram.
Figure 8:
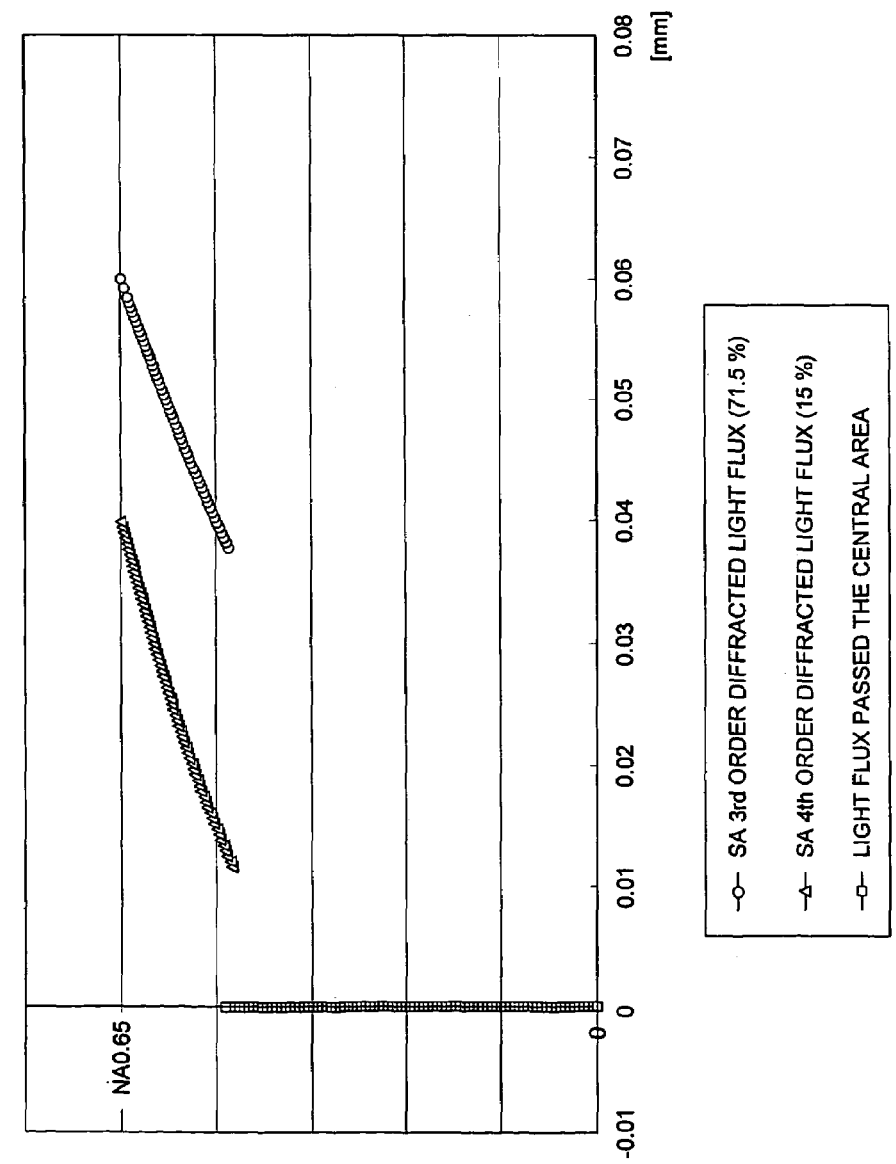

FIG. 7(a) is a vertical spherical aberration view on the information recording surface of the new format optical disc (protective substrate thickness t2=0.9 mm), and FIG. 7(b) is a spot diagram. Further, FIG. 8(a) is a vertical spherical aberration view on the information recording surface of CD (protective substrate thickness t3=1.2 mm), and FIG. 8(b) is a spot diagram.

From FIGS. 7(a), 7(b), and FIGS. 8(a), 8(b), it is seen that the light flux with wavelength λ2 passed the central area is converged on the information recording surface of the new format optical disc and the information recording surface of CD, in the state that the wave-front aberration is not larger than 0.07 (λ2 rms). Further, when it is set in such a manner that the light flux with wavelength λ2 passed the peripheral area is, on the information recording surface of the new format optical disc and the information recording surface of CD, in the state that the wave-front aberration is not smaller than 0.15 (λ2 rms) and the spherical aberration is discontinuous in the vicinity of the border between the central area and the peripheral area, n (=3)th order diffracted light flux of the light flux with wavelength λ2 passed the peripheral area is so-called flared, and is not used for the reproducing of the information on the new format optical disc and CD.

Further, in the light flux with wavelength λ2 passed the peripheral area, its greater part is distributed to n (=3) order diffracted light flux whose diffraction efficiency is 71.5%, and p (=4) order diffracted light flux whose diffraction efficiency is 15%. Then, it is set so that, p-th order diffracted light flux is converged on a paraxial position closer to a paraxial converging position on each information recording surface of the light flux with the wavelength λ2 passed the central area than a n-th order diffracted light flux.

Hereby, it is structured in such a manner that the n-th order diffracted light flux whose diffraction efficiency is large and light amount is large is shifted to a farther position separated from the converged spot as compared to p-th order diffracted light flux.

Example 3

Next, Example 3 will be described.

In the present Example, the incident surface and the projecting surface of the objective lens are respectively aspheric surface-shaped, and the incident surface is divided into the central area of 0≦h<1.095 mm, and the peripheral area of h≧1.095 mm, and on the incident surface, a plurality of diffractive ring-shaped zones which are saw-toothed around the optical axis as the diffractive structure, are formed.

Lens data of the objective lens is shown in Table 3.

TABLE 3

(Example 3)

| Focal distance | | $f_1$ = 2.330 mm, | | $f_2$ = 2.346 mm | |
| Numerical aperture | | NA1 = 0.65 | | NA2 = 0.47 | |
| Image formation magnification | | m = 0.0 | | m = 0.0 | |
| i-th surface | Ri | di (655 nm) | ni (655 nm) | di (785 nm) | ni (785 nm) | |
| 0 | ∞ | ∞ | | ∞ | | |
| 1 | ∞ | 0.00000 | 1.00000 | 0.00000 | 1.00000 | *3 |
| 2 | 1.32147 | 1.20000 | 1.52915 | 1.20000 | 1.52541 | *1 |
| 2' | 1.41766 | −0.00841 | — | −0.00841 | — | *1 |
| 3 | −6.68889 | 1.26716 | — | 1.02525 | — | *2 |
| 4 | ∞ | 0.60000 | 1.57752 | 1.00000 | 1.57063 | |
| 5 | ∞ | | | | | |

*di: the dislocation on the optical axis from the i-th surface to the (i + 1)th surface
*d2': the dislocation on the optical axis from the 2nd surface to the 2'nd surface
*1: aspheric surface and diffractive surface
*2: aspheric surface
*3: stop diameter 2.76 mm
Aspheric surface and diffractive surface data
The 2nd surface (0 ≦ h < 1.095 mm)

| Apheric surface coefficient | |
|---|---|
| κ | −1.1991E+00 |
| A4 | +1.9562E−02 |
| A6 | +3.3287E−03 |
| A8 | −3.3235E−03 |
| A10 | +5.3515E−04 |
| A12 | +2.6330E−04 |

Coefficient of the optical path difference function
(reference wavelength 720 nm)

| B2 | 0.0000 |
|---|---|
| B4 | −4.5076E−03 |
| B6 | +1.7285E−03 |
| B8 | −2.3737E−03 |
| B10 | +7.7854E−04 |

Optimized by the 1st diffraction order
The 2'nd surface (1.095 mm ≦ h)

| Aspheric surface coefficient | |
|---|---|
| κ | −1.1851E+00 |
| A4 | +1.2182E−02 |
| A6 | −1.4272E−02 |
| A8 | +1.6526E−02 |
| A10 | −4.1125E−03 |

Coefficient of the optical path difference function
(reference wavelength 655 nm)

| B2 | +1.5106E−03 |
|---|---|
| B4 | −3.0125E−03 |
| B6 | +1.5243E−03 |
| B8 | −3.2116E−04 |
| B10 | +2.6263E−05 |

TABLE 3-continued

Optimized by the 4th diffraction order
The 3rd surface (0 ≦ h < 1.016 mm)
Apheric surface coefficient

| κ   | −3.4356E+00 |
|-----|-------------|
| A4  | +1.6766E−02 |
| A6  | −2.3956E−03 |
| A8  | −6.3964E−03 |
| A10 | +1.3290E−02 |
| A12 | −1.1787E−02 |
| A14 | +4.6545E−03 |
| A16 | −6.9227E−04 |

As shown in Table 3, the optical pickup apparatus of the present example is set to the focal distance $f_1$=2.330 mm when the wavelength projected from the first light source is λ1=655 nm, image side numerical aperture NA1=0.65, image formation magnification m=0.0, and the focal distance $f_2$=2.346 mm when the wavelength projected from the second light source is λ2=785 nm, image side numerical aperture NA2=0.47, image formation magnification m=0.0.

The surface Nos. 2 and 2' in Table 3 indicate the central area AREA1 and the peripheral area AREA2 of the incident surface of the objective lens, and the surface No. 3 indicates the projecting surface of the objective lens. Further, Ri expresses the radius of curvature, di expresses a position in the optical axis 1 direction from the i-th surface to (i+1)-th surface, and ni expresses the refractive index of each surface.

The 2nd surface, 2'nd surface, third surface are respectively formed into the aspheric surface which is axially symmetric around the optical axis 1, regulated by the equation in which coefficients shown in Table 3 are substituted into the above-described equation (Eq-1). Further, on the 2nd surface and 2'nd surface, the first diffractive structure DOE1 and the second diffractive structure DOE2 are formed. This diffractive structure is expressed by the optical path difference added to the transmission wave-front by this structure. Such an optical path difference is, when h (mm) is a height in the direction perpendicular to the optical axis, and $B_{2i}$ is an optical path difference function coefficient, expressed by the optical path difference function Φ(h) (mm) defined by substituting coefficients shown in Table 3 into the above-described Eq-2.

Hereupon, the first diffractive structure of the central area is formed into the structure in which the blaze wavelength (reference wavelength) is 720 nm, and which is optimized so that the diffraction order of the diffracted light flux having the maximum diffraction efficiency in the diffracted light fluxes of the incident light flux of this wavelength 720 nm, is 1st order, that is, optimized by the diffraction order of 1st order.

Further, the second diffractive structure of the peripheral area is formed into the structure in which the blaze wavelength (reference wavelength) is 655 nm, and which is optimized so that the diffraction order of the diffracted light flux having the maximum diffraction efficiency in the diffracted light fluxes of the incident light flux of this wavelength 655 nm, is 4th order, that is, optimized by the diffraction order of 4th order.

In the present Example, the substrate with the thickness of 1.0 mm (r4=1.0 mm) is virtually arranged, and the objective lens is designed so that the spherical aberration of the converged light flux becomes minimum on the information recording surface of the substrate when the light flux with wavelength λ2 passed the central area of the objective lens, is converged on the paraxial axis between the information recording surface RL2 of the new format optical disc (protective substrate thickness t2=0.9 mm) and the information recording surface RL3 of CD (protective substrate thickness t3=1.2 mm).

FIG. 9(a) is a vertical spherical aberration view on the information recording surface of the virtually arranged substrate, and FIG. 9(b) is a spot diagram.

From FIG. 9, it is seen that the spherical aberration is suppressed to almost 0 within the range of effective diameter, and the flare light generated outside the effective diameter, and the converged spot are separated enough.

Figure 10:
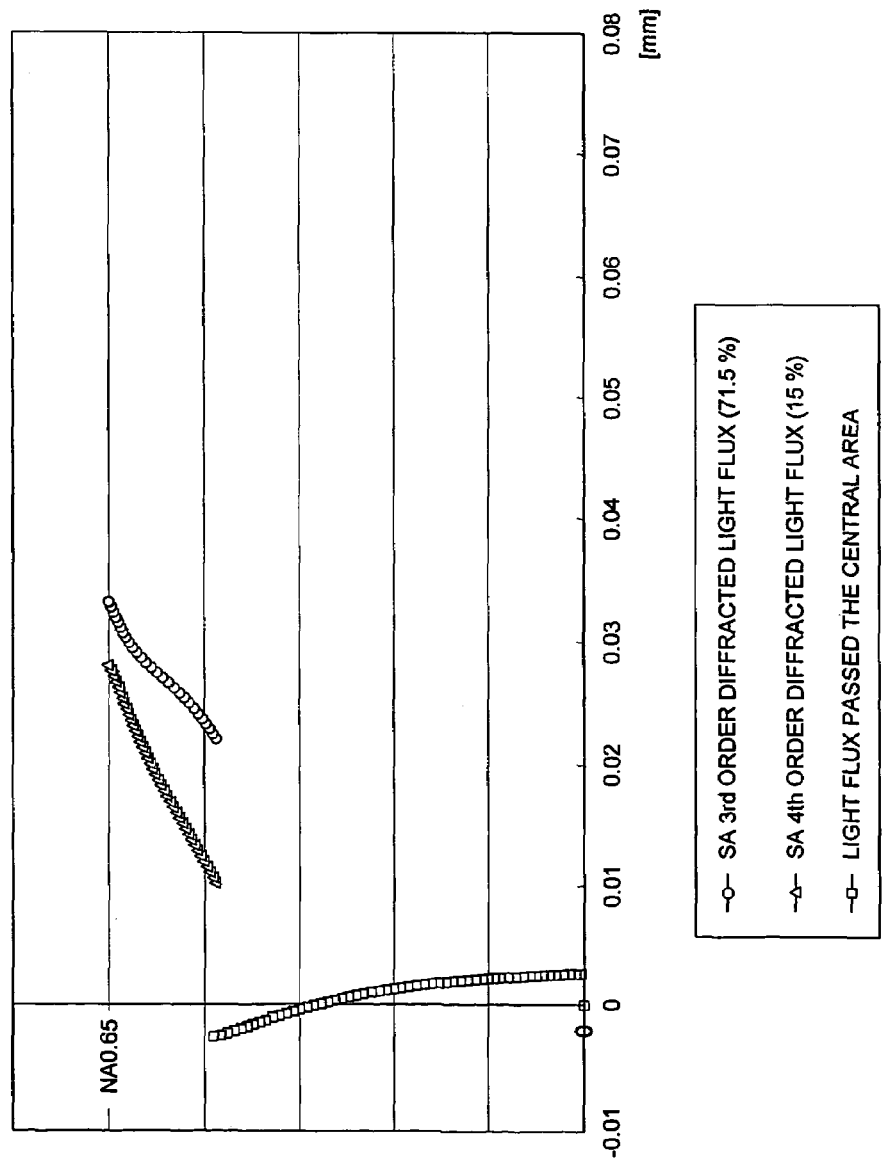
FIG. 10(*a*) is a vertical spherical aberration view and FIG. 10(*b*) is a spot diagram.
Figure 10:
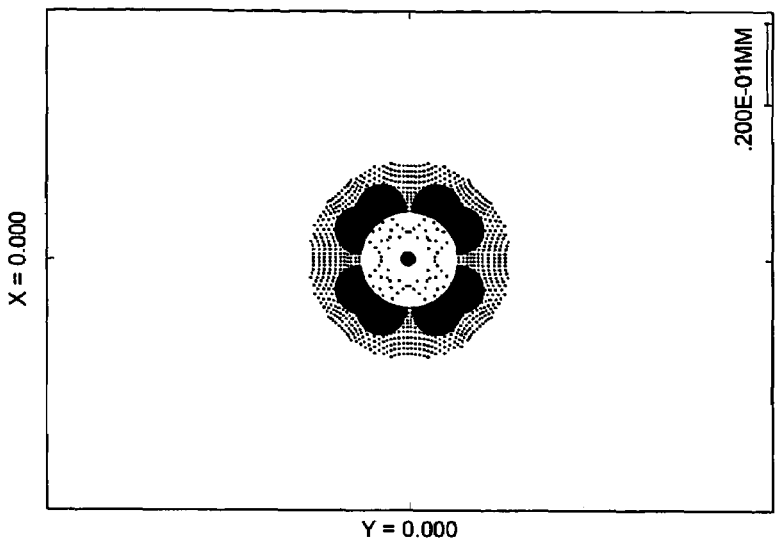

FIG. 10(a) is a vertical spherical aberration view on the information recording surface of the new format optical disc when using an objective lens which is set in such a manner, and FIG. 10(b) is a spot diagram. It is seen from FIGS. 10(a), 10(b) that the generation amount of the spherical aberration within the range of effective diameter is suppressed to a degree which is practically no hindrance, and the flare light generated outside the effective diameter and the converged spot are separated enough.

Figure 11:
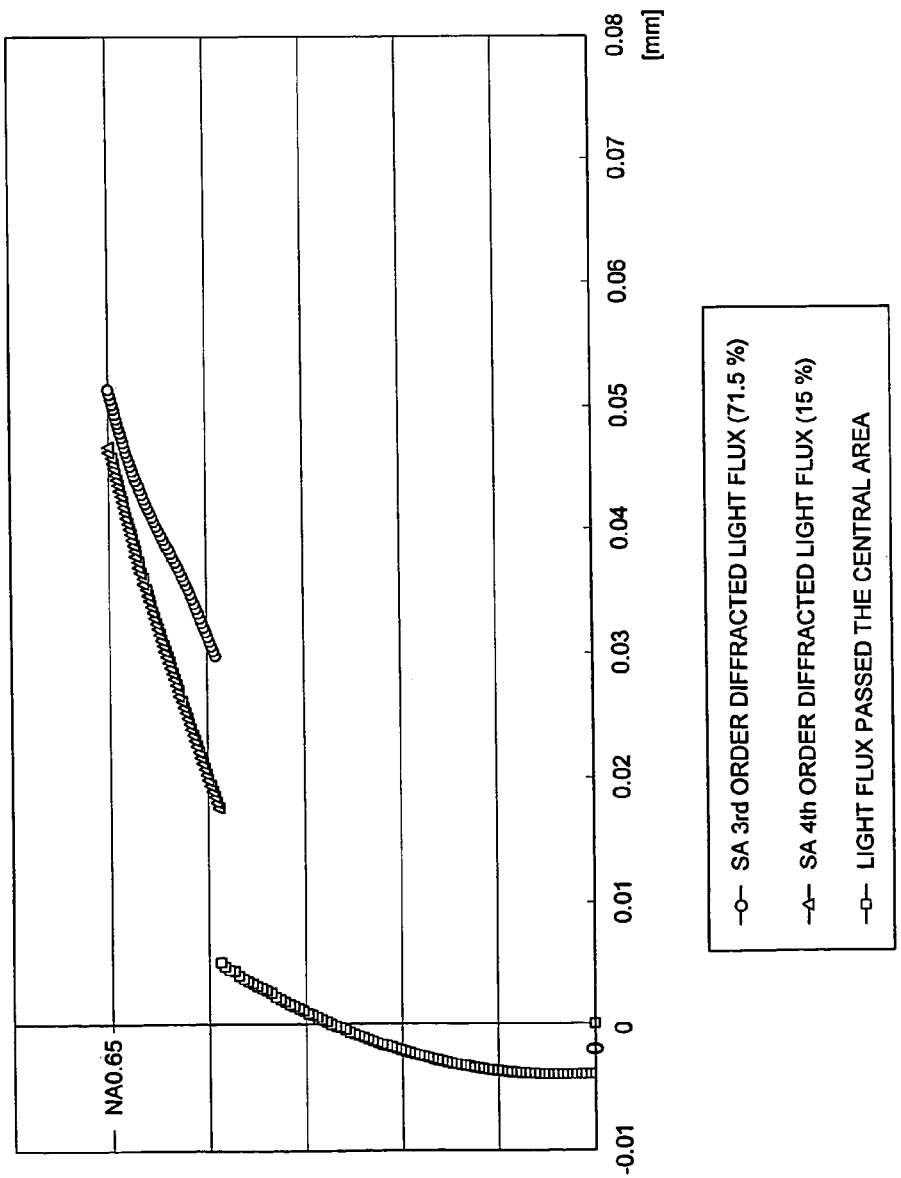
FIG. 11(*a*) is a vertical spherical aberration view and FIG. 11(*b*) is a spot diagram.
Figure 11:
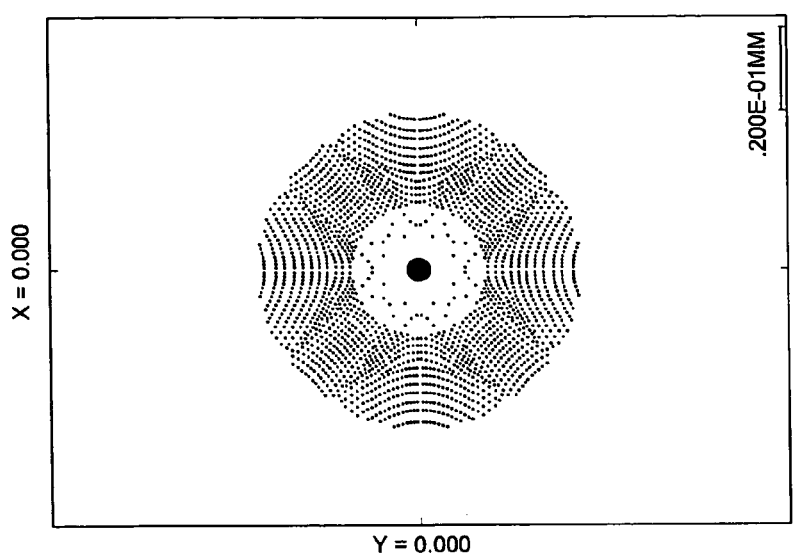

FIG. 11(a) is a vertical spherical aberration view on the information recording surface of the optical disc of CD when using an objective lens which is set in such a manner, and FIG. 11(b) is a spot diagram. It is seen from FIGS. 11(a), 11(b) that the generation amount of the spherical aberration within the range of effective diameter is suppressed to a degree which is practically no hindrance, and the flare light generated outside the effective diameter and the converged spot are separated enough.

Further, in the present example, it is regulated that the diffraction order of the diffracted light flux having the maximum diffraction efficiency in the diffracted light fluxes generated by receiving the diffractive action from the diffractive structure when the light flux with wavelength λ2 passes the central area, is 1 (m=1), and the diffraction order of the diffracted light flux having the maximum diffraction efficiency in the diffracted light fluxes generated by receiving the diffractive action from the diffractive structure when the light flux with wavelength λ2 passes the peripheral area, is 3 (n=3), and it is set so as to satisfy m≦n.

From FIGS. 10(a), 10(b), and FIGS. 11(a), 11(b), it is seen that the light flux with wavelength λ2 passed the central area is converged on the information recording surface of the new format optical disc and the information recording surface of CD, in the state that the wave-front aberration is not larger than 0.07 (λ2 rms). Further, when it is set in such a manner that the light flux with wavelength λ2 passed the peripheral area is, on the information recording surface of the new format optical disc and the information recording surface of CD, in the state that the wave-front aberration is not smaller than 0.15 (λ2 rms) and the spherical aberration is discontinuous in the vicinity of the border between the central area and the peripheral area, n (=3)-th order diffracted light flux of the light flux with wavelength λ2 passed the peripheral area is so-called flared, and is not used for the reproducing of the information on the new format optical disc and CD.

Further, in the light flux with wavelength λ2 passed the peripheral area, its greater part is distributed to n (=3) order diffracted light flux whose diffraction efficiency is 71.5%, and p (=4) order diffracted light flux whose diffraction efficiency is 15%. Then, it is set so that, p-th order diffracted light flux is converged on a paraxial position closer to a paraxial converging position on each information recording surface of the second light flux with wavelength λ2 passed the central area than a n-th order diffracted light flux.

Second Embodiment

Referring to the drawings, the best mode for carrying out the present invention will be detailed below but descriptions for a similar construction to the first embodiment are omitted.

Figure 12:
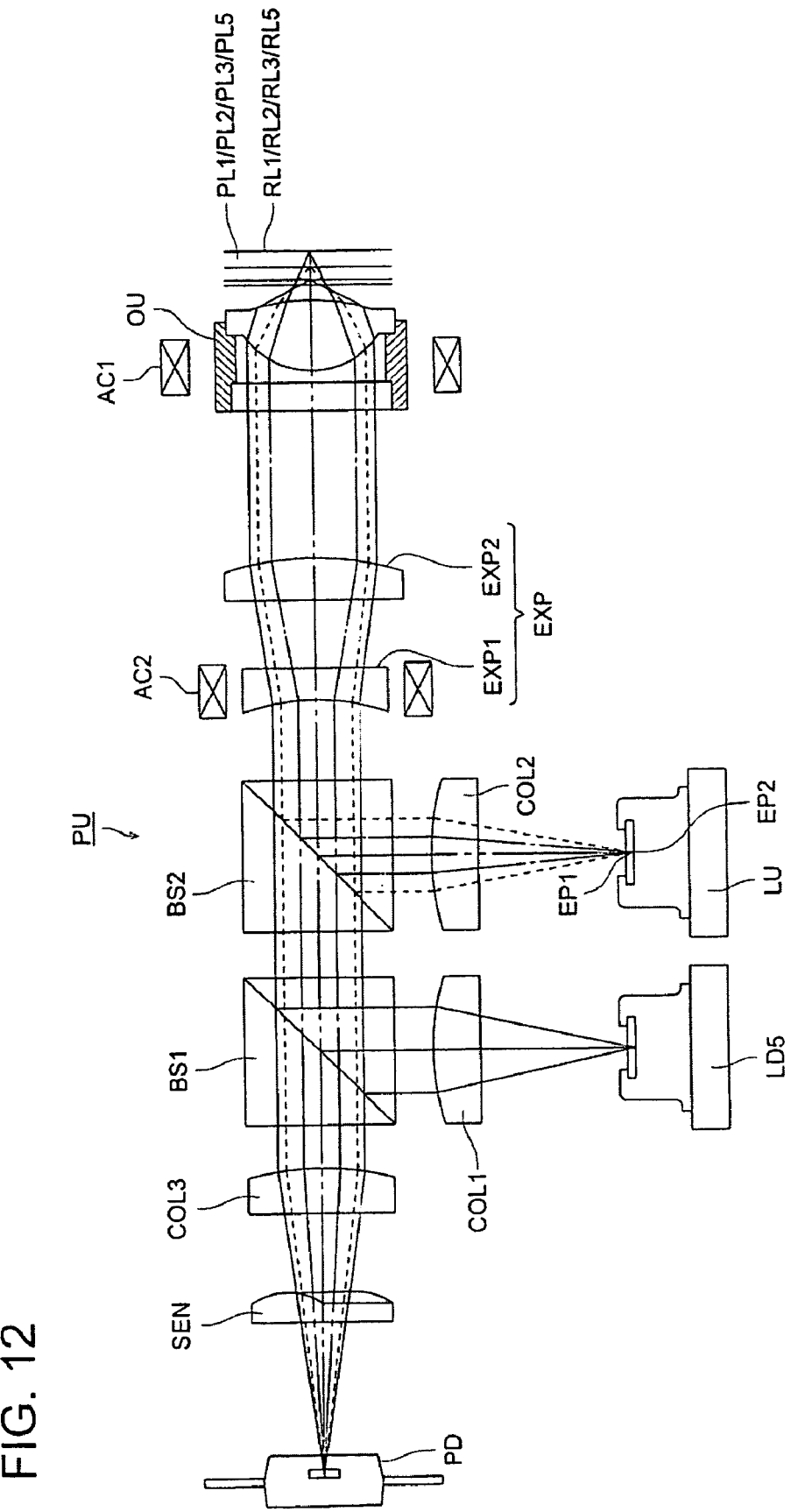
FIG. 12 is a plan view of main parts showing the structure of an optical pickup apparatus.

FIG. 12 is a view roughly showing an optical pickup apparatus PU by which the recording/reproducing of the information can be adequately conducted also on any one of DVD (the first optical information recording medium), new format optical disc (the second optical information recording medium), CD (the third optical information recording medium), and the high density optical disc (the fifth optical information recording medium).

The optical specification of high density optical disc is the wavelength λ5=407 nm, the thickness t5 of protective substrate PL5=0.60 mm, the numerical aperture NA5=0.65.

This embodiment has the characteristic at the point that the optical pickup device PU further includes the structure for recording and or reproducing information appropriately on a high density optical disc.

When the recording and/or reproducing of the information is conducted on DVD, new format optical disc, and CD, the magnification (magnification m1, m2, m3 and m5) of the objective lens OBJ is m1=1/48.1, m2=m3=−1/56.7, m5=1/30, and m5=1/30.

Hereupon, it is preferable that the numerical apertures are within the range satisfying 0.60≦NA1≦0.67, 0.45≦NA2≦0.55, 0.60≦NA5≦0.67, and within the range of λ1=655±20 nm, λ2=785±20 nm, λ5=405±20 nm, 0.5≦t1≦0.7 mm, 0.8≦t2<1.05 mm, 1.05≦t3≦1.3 mm, 0.0≦t5≦0.3 mm. However, the combination of the numerical aperture, wavelength, protective substrate thickness, and magnification is not limited to them.

The optical pickup apparatus PU is provided with: a blue-violet semiconductor laser LD5 (the fifth light source) projecting the laser light flux (the fifth light flux) of 408 nm which is light-emitted when the recording/reproducing of the information is conducted on a high density optical disc; a light source unit LU which is integrated in the case where the first emitting point EP1 (the first light source) projecting the laser light flux (the first light flux) of 658 nm which is light-emitted when the recording/reproducing of the information is conducted on DVD, and the second emitting point EP2 (the second light source) projecting the laser light flux (the second light flux) of 785 nm which is light-emitted when the recording/reproducing of the information is conducted on the new format optical disc and CD, are housed in the same casing; photo-detector PD used for high density optical disc, DVD and CD, commonly; objective lens OBJ on whose optical surface the phase structure DOE is formed, which has a function so as to converge each light flux on each of the information recording surfaces RL1, RL2, RL3 and RL5; 2-axis actuator AC1; 1-axis actuator AC2; expander lens EXP including the first lens EXP1 and the second lens EXP2; the first polarizing beam splitter BS1; the second polarizing beam splitter BS2; the first collimator lens COL1; and the second collimator lens COL2; the third collimator lens COL3.

In the optical pickup apparatus PU, when the recording/reproducing of the information is conducted on a high density optical disc, as its light-ray path is drawn by a solid line in FIG. 12, initially, the blue-violet semiconductor laser LD5 is emitted. The divergent light flux projected from the blue violet semiconductor laser LD1 is converted into a parallel light flux by the first collimate lens COL1 and is reflected by the first polarizing beam splitter BS1. The reflected light flux passes the second polarizing beam splitter BS2 and passes through the first lens EXP1 and the second lens EXP2 with enlarged its diameter. The objective lens OU forms the enlarged light flux into a spot on the information recording surface RL5 through the protective substrate PL5 of the high density optical disc after diameter of the light flux is regulated by a stop STO which is not illustrated. The objective lens OU conducts the focusing or tracking by the 2-axis actuator AC1 arranged in its periphery.

The reflection light flux modulated by the information pit on the information recording surface RL5 passes again the objective lens OU, the second lens EXP2, the first lens EXP1, the second polarized beam splitter BS2, the first polarized beam splitter BS1. The transmitted light flux becomes converged light flux by passing the third collimate lens COL3, and is added astigmatism by sensor lens SEN, and is converged on a light receiving surface of the photo-detector PD. Then, by using the output signal of the photo-detector PD, the information recorded in the high density optical disk can be read.

In the optical pickup apparatus PU, when the recording/reproducing of the information is conducted on DVD, as its light-ray path is drawn by a dashed line in FIG. 12, initially, the emitting point EP1 is light-emitted. The divergent light flux projected from the emitting point EP1 is converted into a parallel light flux by the second collimate lens COL2 and is reflected by the second polarizing beam splitter BS2. The reflected light flux passes through the first lens EXP1 and the second lens EXP2 with enlarged its diameter. The objective lens OU forms the enlarged light flux into a spot on the information recording surface RL1 through the protective substrate PL1 of the high density optical disc after diameter of the light flux is regulated by a stop STO which is not illustrated. The objective lens OU conducts the focusing or tracking by the 2-axis actuator AC1 arranged in its periphery.

The reflection light flux modulated by the information pit on the information recording surface RL1 passes again the objective lens OU, the second lens EXP2, the first lens EXP2, the second polarized beam splitter BS2, the first polarized beam splitter BS1. The transmitted light flux becomes converged light flux by passing the third collimate lens COL3, and is added astigmatism by sensor lens SEN, and is converged on a light receiving surface of the photo-detector PD. Then, by using the output signal of the photo-detector PD, the information recorded in the DVD can be read.

Further, when the recording/reproducing of the information is conducted on the new format optical disc, the emitting point EP2 is light-emitted after the first lens EXP1 is moved along the optical axis by the 1-axis actuator AC2 so that the distance between the first lens EXP1 and the second lens EXP2 is narrower than the distance at the case of information recording/reproducing on the high density optical disk. As its light-ray path is drawn by a dotted line in FIG. 12, the divergent light flux projected from the emitting point EP2 is converted into a gently divergent light flux by the second collimate lens COL2 and is reflected by the second polarizing beam splitter BS2. The reflected light flux passes through the first lens EXP1 and the second lens EXP2 with enlarged its diameter and converted into divergent light flux. The objective lens OU forms the light flux into a spot on the information recording surface RL2 through the protective substrate PL2 of the new format optical disc. The objective lens OU conducts the focusing or tracking by the 2-axis actuator AC1 arranged in its periphery.

The reflection light flux modulated by the information pit on the information recording surface RL2 passes again the objective lens OU, the second lens EXP2, the first lens EXP1, the second polarized beam splitter BS2, the first polarized beam splitter BS1. The transmitted light flux becomes converged light flux by passing the third collimate lens COL3, and is added astigmatism by sensor lens SEN, and is converged on a light receiving surface of the photo-detector PD. Then, by using the output signal of the photo-detector PD, the information recorded in the new format optical disk can be read.

The objective lens OU has a similar construction to the first embodiment and the optical surface S1 facing light source side of the objective lens is divided into a central area AREA1 which includes the optical axis and has a concentric shape and the peripheral area AREA2 which surrounds the central area AREA1.

The central area AREA 1 corresponds to an area through which the light flux used when the reproducing or recording is conducted on the new format optical disc and CD passes, and the peripheral area AREA 2 is an area positioned outside of the central area AREA 1, and corresponds to the area through which the light flux not used when the reproducing or recording is conducted on the new format optical disc and CD, in the light flux with wavelength $\lambda 2$, passes.

The first diffractive structure DOE1 and the second diffractive structure DOE2 formed in the central area AREA1 and the peripheral area AREA2 are structured by a plurality of ring-shaped zones which are arranged concentrically around the optical axis L, and the diffractive action is given to the passing light flux by this ring-shaped zone.

Then, as shown in FIG. 2, the substrate with the thickness of t4 (t2<t4<t3) is virtually arranged in the optical system of the optical pickup apparatus PU, and it is set so that the spherical aberration generated on the information recording surface RL4 by the light flux with wavelength $\lambda 2$ passed the central area AREA1 of the objective lens OU, that is, the spherical aberration of the converged spot formed when through the substrate of the thickness t4 (t2<t4<t3) is the minimum when through the protective substrate of protective substrate thickness t4 (t2<t4<t3).

Hereupon, it is preferable that t4 is within the range of 0.95 mm $\leq$ t4 $\leq$ 1.05 mm.

In this manner, when the light flux with wavelength $\lambda 2$ passed the central area AREA1 is converged on the paraxial axis between the information recording surface RL2 of the new format optical disc and the information recording surface RL3 of CD, which is the position coinciding with an position on the information recording surface RL4 of the virtually arranged the substrate, the light flux with wavelength $\lambda 2$ can be used for the reproducing of the information on both of the news format optical disc and CD.

Further, when it is set in such a manner that the light flux with wavelength $\lambda 2$ passed the central area AREA1 is converged on the information recording surface of the new format optical disc and the information recording surface of CD so that the wavefront aberration is not larger than 0.07 ($\lambda 2$ rms), and the light flux with wavelength $\lambda 2$ passed the peripheral area AREA2 is converged on the information recording surface of the new format optical disc and the information recording surface of CD so that the wave-front aberration is not smaller than 0.15 ($\lambda 2$ rms), and the spherical aberration is discontinuous in the vicinity of the border between the central area AREA1 and the peripheral area AREA2, it is set so that the n-th order diffracted light flux of the light flux with wavelength $\lambda 2$ passed the peripheral area AREA2 is flared, and is not used for reproducing of the information on the new format optical disc and CD.

Further, it is set in such a manner that the light flux with wavelength $\lambda 1$ passed the central area AREA1 and the peripheral area AREA2 is converged on the information recording surface of DVD so that the wave-front aberration is not larger than 0.07 ($\lambda 1$ rms) and the light flux with wavelength $\lambda 5$ passed the central area AREA1 and the peripheral area AREA2 is converged on the information recording surface of the high density optical disc so that the wavefront aberration is not larger than 0.07 ($\lambda 1$ rms). Hereby, it is set so that the compatibility among the new format optical disc, DVD and CD can be attained.

Example 4

Next, Example 4 will be described.

In the present Example, the incident surface and the projecting surface of the objective lens are respectively aspheric surface-shaped, and the incident surface is divided onto the central area of $0 \leq h < 1.67$ mm, and the peripheral area of $h \leq 1.67$ mm, and on the incident surface, a plurality of diffractive ring-shaped zones which are saw-toothed around optical axis as the diffractive structure, are formed.

Lens data of the objective lens is shown in Table 4.

TABLE 4

(Example 4)

| | | | | | | |
|---|---|---|---|---|---|---|
| Focal length | | $f_5$ = 3.10 mm | | $f_1$ = 3.18 mm | | $f_2$ = 3.19936 mm |
| Numerical aperture | | NA5 = 0.65 | | NA1 = 0.65 | | NA2 = 0.51 |
| Imaging magnification | | m5 = 1/30 | | m1 = 1/48.1 | | m2 = −1/56.7 |

| $i^{th}$ Surface | Ri | di (407 nm) | ni (407 nm) | di (655 nm) | ni (655 nm) | di (785 nm) | ni (785 nm) | |
|---|---|---|---|---|---|---|---|---|
| 0 | | ∞ | | 32.60744 | | 20.64962 | | |
| 1 | ∞ | 1.00000 | 1.52994 | 1.00000 | 1.51436 | 1.00000 | 1.5111 | *3 |
| 2 | 1.80555 | 0.10000 | 1.00000 | 0.10000 | 1.00000 | 0.10000 | 1.0000 | *1 |
| 2' | 1.79829 | 0.10000 | 1.00000 | 0.10000 | 1.00000 | 0.10000 | 1.0000 | *1 |
| 3 | −12.88985 | 2.50000 | 1.62417 | 2.50000 | 1.60423 | 2.50000 | 1.6002 | *2 |
| 4 | −5.93291 | 0.84612 | 1.00000 | 0.76461 | 1.00000 | 0.51117 | 1.0000 | |
| 5 | 1.8055 | 0.10000 | 1.61869 | 0.60000 | 1.57721 | 1.20000 | 1.5704 | |

*di: the displacement on the optical axis from the i-th surface to the (i + 1)th surface
*d2': the displacement on the optical axis from the 2nd surface to the 2'nd surface
*1: aspheric surface · diffractive surface
*2: aspheric surface
*3: stop diameter 4.04 mm

TABLE 4-continued

Aspheric surface and diffractive surface data
The 2nd surface ($0 \leq h < 1.67$ mm)

Apheric surface coefficient

| κ   | −9.8159E−01 |
|-----|-------------|
| A4  | −1.9735E−02 |
| A6  | 1.8065E−02  |
| A8  | −3.8974E−03 |
| A10 | 1.3479E−04  |
| A12 | 4.7549E−05  |
| A14 | −5.1705E−06 |

Coefficient of the optical path difference function (reference wavelength 407 nm)

| B2  | 3.2464E−04  |
|-----|-------------|
| B4  | −1.6051E−03 |
| B6  | 1.0198E−03  |
| B8  | −2.7554E−04 |
| B10 | 2.4625E−05  |

Optimized by the $10^{th}$ diffraction order
The 2'nd surface ($1.67$ mm $\leq h$)

Aspheric surface coefficient

| κ   | −7.0360E−01 |
|-----|-------------|
| A4  | −9.8236E−03 |
| A6  | 5.3416E−03  |
| A8  | 4.0906E−04  |
| A10 | −7.5735E−04 |
| A12 | 2.0228E−04  |
| A14 | −1.9699E−05 |

Coefficient of the optical path difference function (reference wavelength 407 nm)

| B2  | −1.8050E−03 |
|-----|-------------|
| B4  | −1.1154E−03 |
| B6  | 1.1115E−03  |
| B8  | −3.3125E−04 |
| B10 | 3.1541E−05  |

Optimized by the $5^{th}$ diffraction order
The 3rd surface
Apheric surface coefficient

| κ   | −137.1668273 |
|-----|--------------|
| A4  | 5.7767E−04   |
| A6  | 5.2379E−03   |
| A8  | −3.0823E−03  |
| A10 | 8.8889E−04   |
| A12 | −1.5416E−04  |
| A14 | 1.1146E−05   |

As shown in Table 4, the optical pickup apparatus of the present example is set to the focal distance $f_1=3.18$ mm when the wavelength projected from the first light source is $\lambda 1=655$ nm, image side numerical aperture NA1=0.65, image formation magnification m1=1/48.1, the focal distance $f_2=3.19936$ mm when the wavelength projected from the second light source is $\lambda 2=785$ nm, image side numerical aperture NA2=0.51, image formation magnification m2=−1/56.7, and the focal distance $f_5=3.19936$ mm when the wavelength projected from the second light source is $\lambda 5=407$ nm, image side numerical aperture NA5=0.65, image formation magnification m5=1/30.

The surface Nos. 2 and 2' in Table 4 indicate the central area AREA1 and the peripheral area AREA2 of the incident surface of the objective lens, and the surface No. 3 indicates the projecting surface of the objective lens. Further, Ri expresses the radius of curvature, di expresses a position in the optical axis 1 direction from the i-th surface to (i+1)-th surface, and ni expresses the refractive index of each surface.

The 2nd surface, 2'nd surface, third surface are respectively formed into the aspheric surface which is axially symmetric around the optical axis L, regulated by the equation in which coefficients shown in Table 4 are substituted into the above-described equation (Eq-1).

Further, on the 2nd surface and 2'nd surface, the first diffractive structure DOE1 and the second diffractive structure DOE2 are formed. This diffractive structure is expressed by the optical path difference added to the transmission wavefront by this structure. Such an optical path difference is, when h (mm) is a height in the direction perpendicular to the optical axis, and $B_{2i}$ is an optical path difference function coefficient, expressed by the optical path difference function Φ(h) (mm) defined by substituting coefficients shown in Table 4 into the above-described Eq-2.

Hereupon, the first diffractive structure of the central area is formed into the structure in which the blaze wavelength (reference wavelength) is 407 nm, and which is optimized so that the diffraction order of the diffracted light flux having the maximum diffraction efficiency in the diffracted light fluxes of the incident light flux of this wavelength 407 nm, is 10th order, that is, optimized by the diffraction order of 10th order.

Further, the second diffractive structure of the peripheral area is formed into the structure in which the blaze wavelength (reference wavelength) is 407 nm, and which is optimized so that the diffraction order of the diffracted light flux having the maximum diffraction efficiency in the diffracted light fluxes of the incident light flux of this wavelength 407 nm, is 5th-order, that is, optimized by the diffraction order of 5th-order.

Further, in the present example, it is regulated that the diffraction order of the diffracted light flux having the maximum diffraction efficiency in the diffracted light fluxes generated by receiving the diffractive action from the diffractive structure when the light flux with wavelength $\lambda 2$ passes the central area, is 5 (m=5), and the light flux with wavelength $\lambda 2$ does not receive diffractive action by the diffractive structure when the light flux with wavelength $\lambda 2$ passes the peripheral area.

Figure 14:
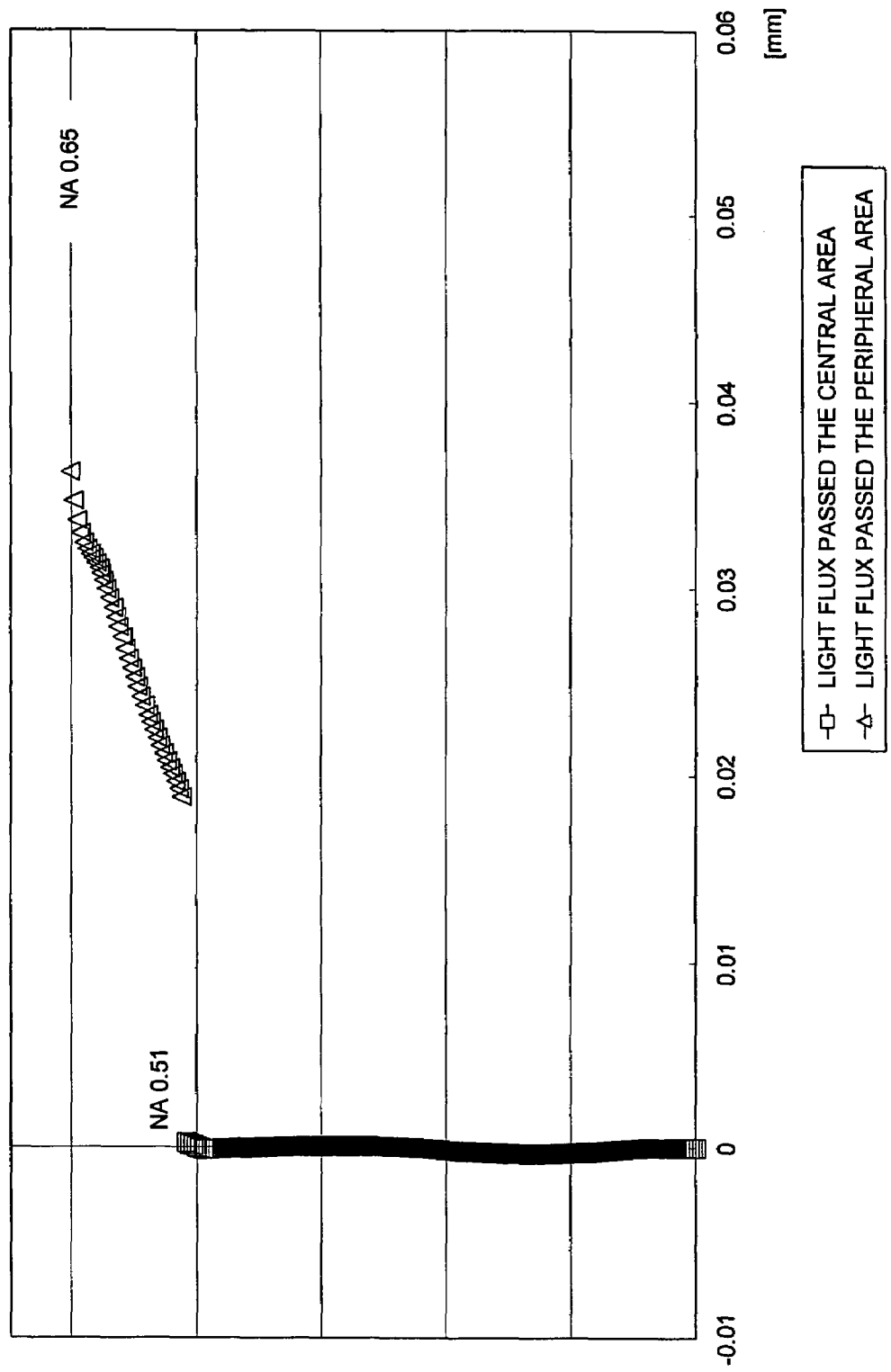
FIG. 14 is a vertical spherical aberration view.

FIG. 14 is a vertical spherical aberration view on the information recording surface of the virtually arranged fourth optical information recording medium. From FIG. 14, it is seen that the spherical aberration is suppressed to almost 0 within the range of effective diameter.

Figure 15:
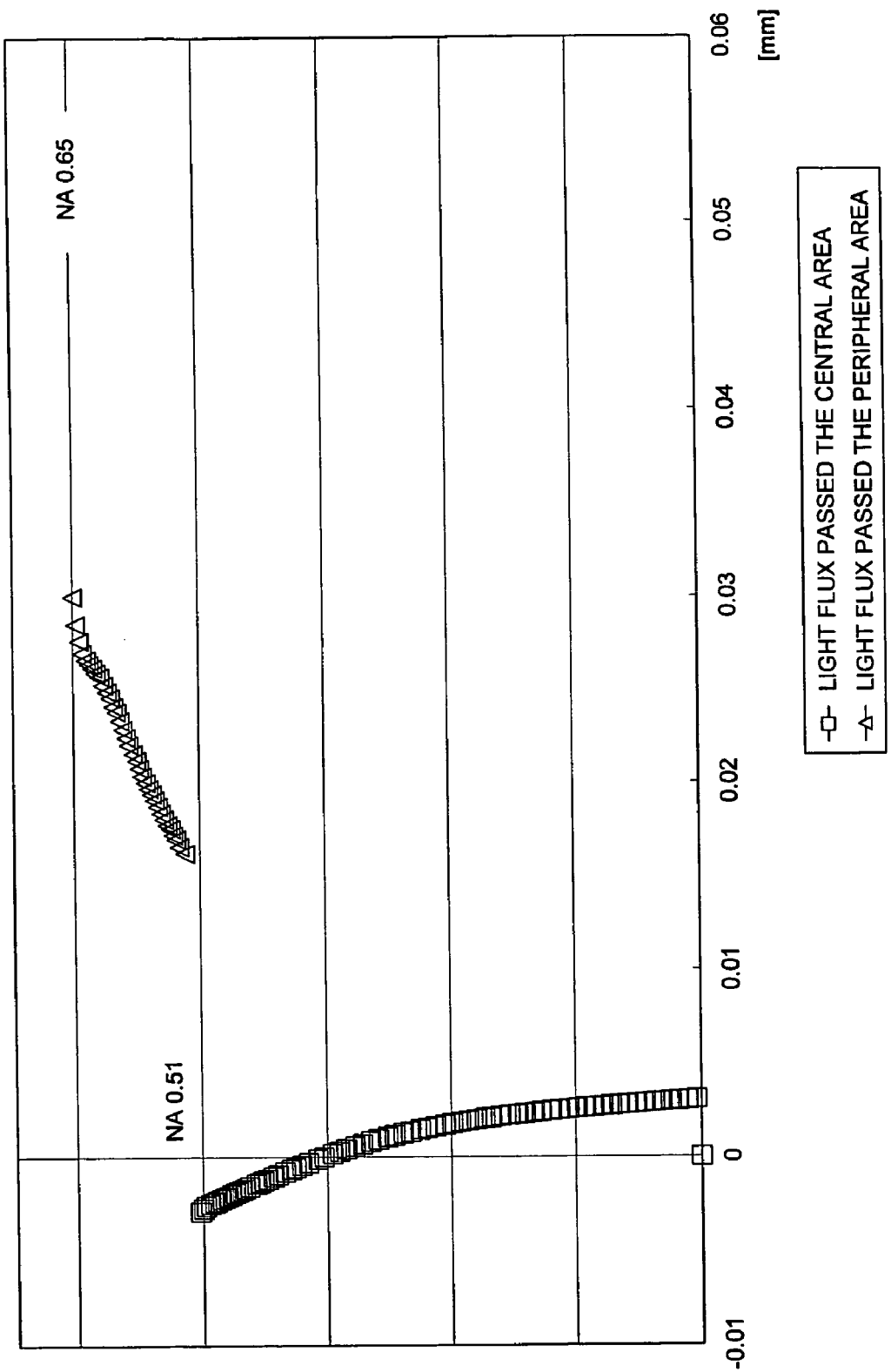
FIG. 15 is a vertical spherical aberration view.

FIG. 15 is a vertical spherical aberration view on the information recording surface of the new format optical disc (protective substrate thickness t2=0.9 mm. Further, FIG. 16 is a vertical spherical aberration view on the information recording surface of CD (protective substrate thickness t3=1.2 mm.

Figure 16:
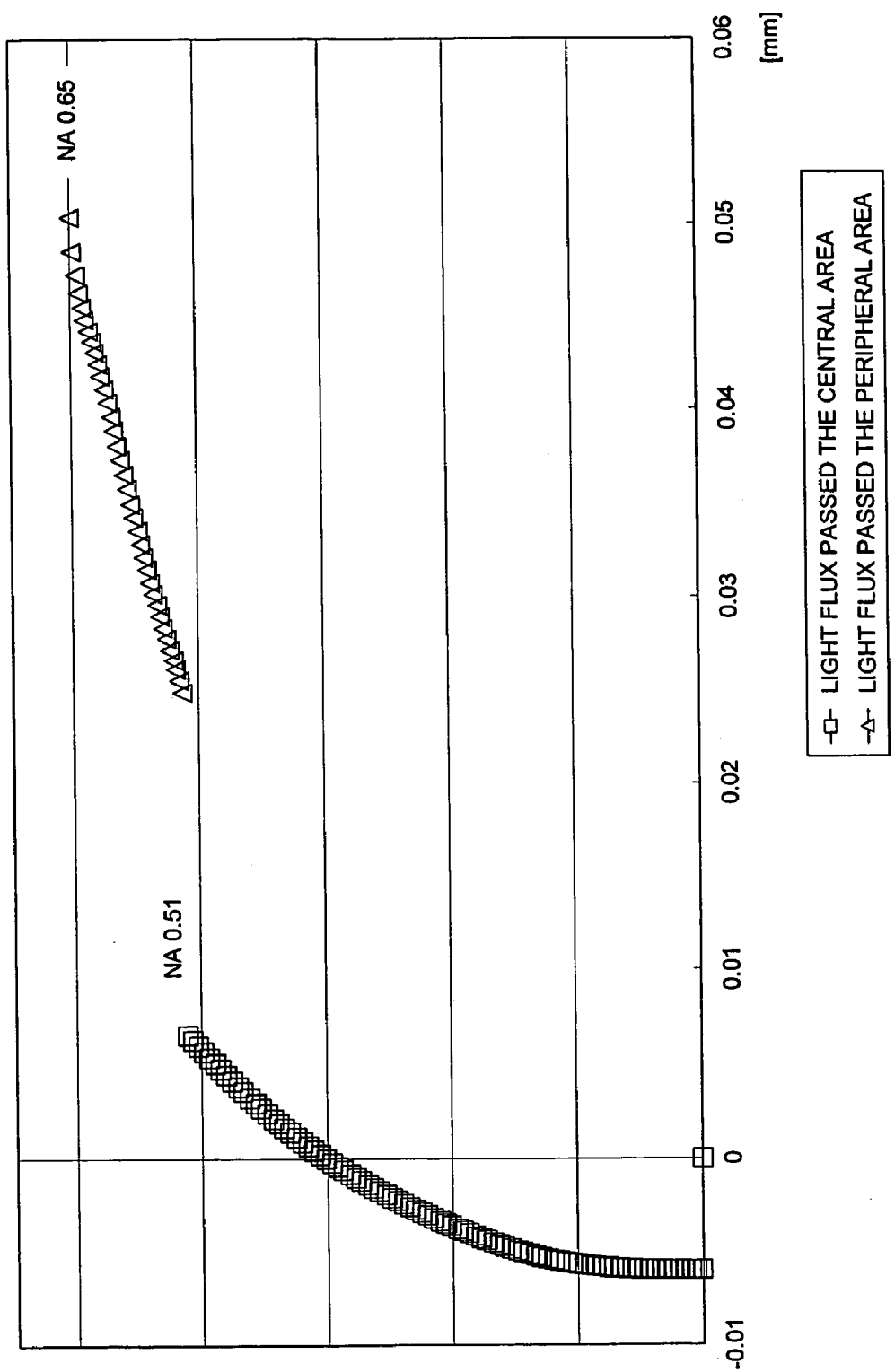
FIG. 16 is a vertical spherical aberration view.

From FIG. 15 and FIG. 16, it is seen that the light flux with wavelength $\lambda 2$ passed the central area is converged on the information recording surface of the new format optical disc and the information recording surface of CD, in the state that the wave-front aberration is not larger than 0.07 ($\lambda 2$ rms). Further, when it is set in such a manner that the light flux with wavelength $\lambda 2$ passed the peripheral area is, on the information recording surface of the new format optical disc and the information recording surface of CD, in the state that the wave-front aberration is not smaller than 0.15 ($\lambda 2$ rms) and the spherical aberration is discontinuous in the vicinity of the border between the central area and the peripheral area, the light flux with wavelength $\lambda 2$ passed the peripheral area is so-called flared, and is not used for the reproducing of the information on the new format optical disc and CD.

Third Embodiment

Figure 13:
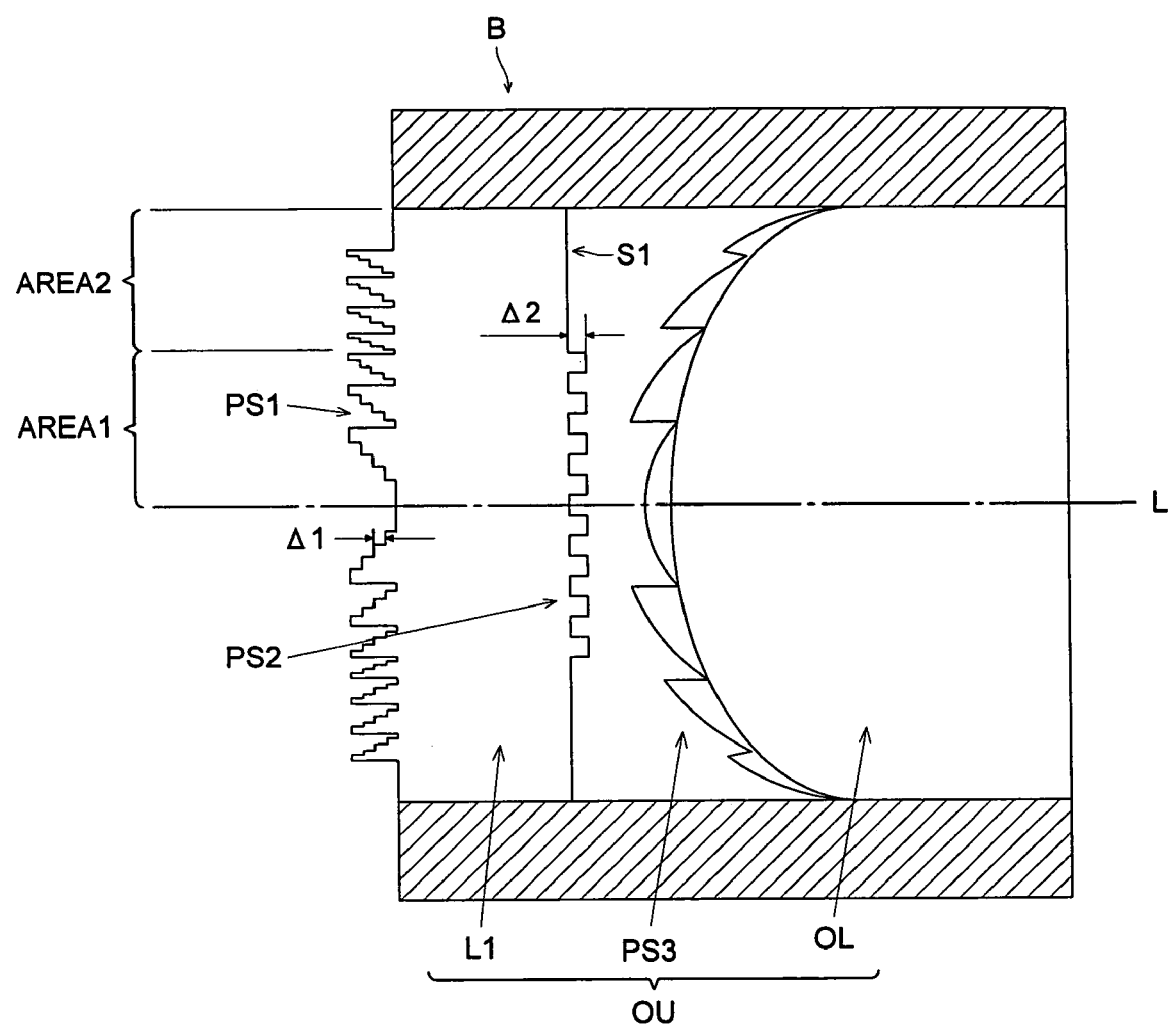
FIG. 13 is a sectional view of main parts showing the structure of an objective lens.

Referring to the drawings, the third embodiment of the present invention is described below. The structure of the optical pickup apparatus PU of the embodiment is schematically similar to the structure described in the second embodiment, but the optical pickup lens OU has a structure includes a first aberration correcting lens L1 made of resin and a converging optical element OL having an spherical surface designed such that the spherical aberration becomes maximum for each of the fifth wavelength $\lambda 5$ and the thickness t5 of the protective layer PL5 of the high density optical disc, as shown in FIG. 13. The first aberration correcting lens and the converging optical element are coaxially integrated in one body using the same optical axis through the lens frame B. Concretely, the first aberration correcting lens L1 is engaged to be fixed to one edge of the cylindrical lens frame B through the lens frame and the converging optical element OU is engaged to be fixed to another edge of the lens frame B, in order to make the structure that the first aberration correcting lens L1 and the converging optical element are coaxially integrated in one body along the optical axis.

The optical specification of high density optical disc is the wavelength $\lambda 5$=408 nm, the thickness t5 of protective substrate PL5=0.2 mm, the numerical aperture NA5=0.85.

The optical surface facing light source side of the converging optical element OL includes the first phase structure PS1.

The optical surface facing light source side of the first aberration correcting lens L1 includes the second phase structure PS2 and the optical surface (S1) facing optical disc side of the first aberration correcting lens L1 includes the third phase structure PS3.

The optical surface S1 of the objective lens is, as shown in FIG. 13, divided into the central area AREA 1 which is a concentric circular area including the optical axis L, and the peripheral area AREA 2 which covers the periphery of the central area AREA 1. The second phase structure PS2 is arranged on the central area AREA 1.

The central area AREA 1 corresponds to an area through which the light flux used when the reproducing or recording is conducted on the new format optical disc and CD passes, and the peripheral area AREA 2 is an area positioned outside of the central area AREA 1, and corresponds to the area through which the light flux not used when the reproducing or recording is conducted on the new format optical disc and CD, in the light flux with wavelength $\lambda 2$, passes.

The first phase structure PS1 does not diffract the light flux with the wavelength $\lambda 5$ and the light flux with the wavelength $\lambda 2$ and diffracts the light flux with the wavelength $\lambda 1$. The first phase structure PS1 has a structure that a plurality of ring-shaped patterns are arranged concentrically. Each of the plurality of patterns has a cross section including an optical axis in a stepped shape with a plurality of levels, and height of each step is shifted for every predefined number of levels by height of steps corresponding to the predefined number of levels (5 levels and 4 steps in this embodiment).

Each of step difference $\Delta 1$ in the stepped structure is regulated to height satisfying $\Delta 1 = 2 \times \lambda 1/(n1-1) = 1.44$ μm, where n1 is a refractive index of the first aberration correcting lens L1 for the wavelength $\lambda 5$ ($\lambda 5$=408 nm in this embodiment).

The step difference $\Delta 1$ adds the optical path difference of $2 \times \lambda 5$ to the light flux with the wavelength $\lambda 5$ and the light flux with the wavelength $\lambda 5$ transmits the first phase structure PS1 without any action from the first phase structure PS1.

The step difference $\Delta 1$ adds the optical path difference of $1 \times \lambda 2$ ($\lambda 2$=785 nm in this embodiment) to the light flux with the wavelength $\lambda 2$ and the light flux with the wavelength $\lambda 2$ also transmits the first phase structure PS1 without any action from the first phase structure PS1.

The step difference $\Delta 1$ adds the optical path difference of $1.20 \times \lambda 1$ ($\lambda 1$=658 nm in this embodiment) to the light flux with the wavelength $\lambda 1$ and phase difference of the light flux with the wavelength $\lambda 1$ passing adjusting levels of the step difference $\Delta 1$ is $2\pi/5$. One pattern is divided in five portions and phase difference of the light flux with the wavelength $\lambda 1$ in one pattern becomes $5 \times 2\pi/5 = 2\pi$. The first phase structure makes 1st order diffracted light flux.

As described above, the first phase structure PS1 diffracts only the light flux with the wavelength $\lambda 1$ selectively and corrects spherical aberration comes from the thickness difference between the protective layers of the high density optical disk and DVD.

A diffraction efficiency of the $0^{th}$ order diffracted light flux (transmitting light flux) of the light flux with the wavelength $\lambda 5$ generated in the first phase structure PS1 is 100%, a diffraction efficiency of the first order diffracted light flux of the light flux with the wavelength $\lambda 1$ generated in the first phase structure PS1 is 87.5%, a diffraction efficiency of the 0th order diffracted light flux (transmitting light flux) of the light flux with the wavelength λ2 generated in the first phase structure PS1 is 100%. Therefore, each light flux provides high diffraction efficiency.

The second phase structure PS2 does not diffract the light flux with the wavelength λ5 and the light flux with the wavelength λ1 and diffracts the light flux with the wavelength λ2. The second phase structure PS2 has a structure that a plurality of ring-shaped patterns are arranged concentrically. Each of the plurality of patterns has a cross section including an optical axis in a stepped shape with a plurality of levels, and height of each step is shifted for every predefined number of levels by height of steps corresponding to the predefined number of levels (2 levels and 1 steps in this embodiment).

Each of step difference Δ2 in the stepped structure is regulated to height satisfying Δ2=5×λ1/(n1−1)=3.60 μm, where n1 is a refractive index of the first aberration correcting lens L1 for the wavelength λ5.

The step difference Δ2 adds the optical path difference of 5×λ5 to the light flux with the wavelength λ5 and the light flux with the wavelength λ5 transmits the second phase structure PS2 without any action from the second phase structure PS2.

The step difference Δ2 adds the optical path difference of 1×λ1 to the light flux with the wavelength λ1 and the light flux with the wavelength λ1 also transmits the second phase structure PS2 without any action from the second phase structure PS2.

The step difference Δ2 adds the optical path difference of 2.5×λ2 to the light flux with the wavelength λ2 and phase difference of the light fluxes with a wavelength λ2 passing adjusting levels of the step difference Δ2 is π/2. One pattern is divided in two portions and phase difference of the light flux with the wavelength λ2 in one pattern becomes 2×π/2=π. Most light amount of the light flux with the wavelength λ2 entering into the second phase structure is distributed to the first order diffracted light flux and the—first order diffracted light flux. The second phase structure PS2 is designed so as to converge the light flux with the wavelength λ1 on the information recording surface RL2 of CD.

As described above, the second phase structure PS2 diffracts only the light flux with the wavelength λ2 selectively and corrects spherical aberration comes from the thickness difference between the protective layers of the high density optical disk and CD.

A diffraction efficiency of the $0^{th}$ order diffracted light flux (transmitting light flux) of the light flux with the wavelength λ5 generated in the first phase structure PS1 is 100%, a diffraction efficiency of the 0th order diffracted light flux (transmitting light flux) of the light flux with the wavelength λ1 generated in the first phase structure PS1 is 100%, and a diffraction efficiency of the second order diffracted light flux of the light flux with the wavelength λ2 generated in the first phase structure PS1 is 40.5%. Therefore, light fluxes for the high density optical disc and DVD which requires accelerating of information recording and reproducing provide high diffraction efficiencies.

The third phase structure has a diffractive structure whose cross section including the optical axis is a serrated shape and is designed so as to generate $\alpha1=2^{nd}$ order diffracted light flux for the entering light flux with a wavelength λ1. Therefore the second order diffracted light flux of the light flux with the wavelength λ1 can be used for proper information recording and reproducing.

The third phase structure is designed so as to generate $\beta1=1^{st}$ ($\beta1<\alpha1$) order diffracted light flux for the entering light flux with a wavelength λ1 and generate γ1=1 (γ1≦β3).

Diffraction efficiencies of $\alpha1=1^{st}$ order diffracted light flux of the light flux with the wavelength λ5, $\beta1=1^{st}$ order diffracted light flux of the light flux with the wavelength λ1, and $\gamma1=0^{th}$ order diffracted light are 100%, 87.8% and 100%, respectively and each light flux provides high diffraction efficiency.

Then, as shown in FIG. 2, the substrate with the thickness of t4 (t2<t4<t3) is virtually arranged in the optical system of the optical pickup apparatus PU, and it is set so that the spherical aberration generated on the information recording surface RL4 by the light flux with wavelength λ2 passed the central area AREA1 of the objective lens OBJ, that is, the spherical aberration of the converged spot formed when through the substrate of the thickness t4 (t2<t4<t3) is the minimum when through the protective substrate of protective substrate thickness t4 (t2<t4<t3).

Hereupon, it is preferable that t4 is within the range of 0.95 mm≦t4≦1.05 mm.

In this manner, when the light flux with wavelength λ2 passed the central area AREA1 is converged on the paraxial axis between the information recording surface RL2 of the new format optical disc and the information recording surface RL3 of CD, which is the position coinciding with an position on the information recording surface RL4 of the virtually arranged the substrate, the light flux with wavelength λ2 can be used for the reproducing of the information on both of the news format optical disc and CD.

Further, in the case where the diffraction order of the diffracted light flux having the maximum diffraction efficiency in the diffracted light fluxes generated when the light flux with wavelength λ2 passes the first diffractive structure DOE1 is m, and the diffraction order of the diffracted light flux having the maximum diffraction efficiency in the diffracted light fluxes generated when the light flux with wavelength λ2 passes the second diffractive structure DOE2 is n, it is set so as to satisfy m≦n.

Further, when it is set in such a manner that the light flux with wavelength λ2 passed the central area AREA1 is converged on the information recording surface of the new format optical disc and the information recording surface of CD so that the wave-front aberration is not larger than 0.07 (λ2 rms), and the light flux with wavelength λ2 passed the peripheral area AREA2 is converged on the information recording surface of the new format optical disc and the information recording surface of CD so that the wave-front aberration is not smaller than 0.15 (λ2 rms), and the spherical aberration is discontinuous in the vicinity of the border between the central area AREA1 and the peripheral area AREA2, it is set so that the n-th order diffracted light flux of the light flux with wavelength λ2 passed the peripheral area AREA2 is flared, and is not used for reproducing of the information on the new format optical disc and CD.

Further, it is set in such a manner that the light flux with wavelength λ 1 passed the central area AREA1 and the peripheral area AREA2 is converged on the information recording surface of DVD so that the wave-front aberration is not larger than 0.07 (λ1 rms). Hereby, it is set so that the compatibility among the new format optical disc, DVD and CD can be attained.

Example 4

Next, Example 4 will be described.

In the present Example, the incident surface and the projecting surface of the aberration correcting element included in the objective lens are respectively plane, and the incident surface is divided into the central area of 0≦h<1.11 mm, and the peripheral area of h≧1.11 mm, and a plurality of diffractive ring-shaped zones around the optical as the diffractive structure, are formed on the central Lens data of the objective lens is shown in Table 5.

TABLE 5

(Example 5)

| | | | | | | |
|---|---|---|---|---|---|---|
| Focal length | $f_5$ = 2.2 mm | | $f_1$ = 2.28 mm | | $f_2$ = 2.37 mm | |
| Numerical aperture | NA5 = 0.85 | | NA1 = 0.65 | | NA2 = 0.45 | |
| Imaging magnification | m5 = 0 | | m1 = 0 | | m2 = 0 | |

| $i^{th}$ surface | Ri | di (408 nm) | ni (408 nm) | di (658 nm) | ni (658 nm) | di (785 nm) | ni (785 nm) | |
|---|---|---|---|---|---|---|---|---|
| 0 | | ∞ | | ∞ | | ∞ | | |
| 1 | ∞ | 0.000 | | 0.000 | | 0.000 | | *3 |
| 2 | ∞ | 0.900 | 1.56652 | 0.900 | 1.54691 | 0.900 | 1.54316 | *4 |
| 3 | ∞ | 0.100 | | 0.100 | | 0.100 | | *5 |
| 4 | 1.41914 | 2.620 | 1.56652 | 2.620 | 1.54691 | 2.620 | 1.54316 | *1 |
| 5 | −3.35718 | 0.6758 | | 0.4500 | | 0.4357 | | *2 |
| 6 | ∞ | 0.0875 | 1.62110 | 0.6000 | 1.57975 | 1.0000 | 1.57326 | |
| 7 | ∞ | | | | | 1.0000 | | |

*di: the displacement on the optical axis from the i-th surface to the (i + 1)th surface
*1: aspheric surface · diffractive surface
*2: aspheric surface
*3: stop diameter 3.74 mm
*4: first phase structure
*5: second phase structure Aspheric surface and diffractive surface data
The 2nd surface
Coefficient of the optical path difference function
(reference wavelength 658 nm)

| | |
|---|---|
| B2 | 4.2997E−03 |
| B4 | −2.3238E−03 |
| B6 | 3.2549E−04 |
| B8 | −1.6286E−04 |
| B10 | 1.3701E−05 |

Optimized by the $1^{st}$ diffraction order
The 3rd surface (0 ≦ h < 1.11 mm)
Coefficient of the optical path difference function
(reference wavelength 785 nm)

| | |
|---|---|
| B2 | 2.4471E−02 |
| B4 | −1.9338E−03 |
| B6 | 1.7641E−03 |
| B8 | −7.8868E−04 |
| B10 | 1.5513E−04 |

Optimized by the $1^{st}$ diffraction order
The 4th surface

Aspheric surface coefficient

| | |
|---|---|
| κ | −6.5353E−01 |
| A4 | −3.0407E−03 |
| A6 | 7.6952E−04 |
| A8 | 2.0042E−03 |
| A10 | −1.3367E−03 |
| A12 | 2.4426E−04 |
| A14 | 2.2537E−04 |
| A16 | −1.6578E−04 |
| A18 | 4.3765E−05 |
| A20 | −4.3780E−06 |

Coefficient of the optical path difference function
(reference wavelength 408 nm)

| | |
|---|---|
| B2 | 0 |
| B4 | −3.7303E−03 |
| B6 | 4.8674E−04 |
| B8 | −6.0552E−05 |
| B10 | −2.4194E−05 |

Optimized by the $2^{nd}$ diffraction order
The 5th surface
Aspheric surface coefficient

| | |
|---|---|
| κ | −100 |
| A4 | 1.0205E−01 |
| A6 | −9.3503E−02 |

TABLE 5-continued

| | |
|---|---|
| A8 | 6.0215E-02 |
| A10 | -3.3522E-02 |
| A12 | 1.1443E-02 |
| A14 | -1.6675E-03 |
| A16 | 0 |
| A18 | 0 |
| A20 | 0 |

As shown in Table 5, the optical pickup apparatus of the present example is set to the focal distance $f_1$=2.28 mm when the wavelength projected from the first light source is $\lambda 1$=658 nm, image side numerical aperture NA1=0.65, image formation magnification m1=0.0, the focal distance $f_2$=2.37 mm when the wavelength projected from the second light source is $\lambda 2$=785 nm, image side numerical aperture NA2=0.45, image formation magnification m2=0.0, and the focal distance $f_5$=2.2 mm when the wavelength projected from the second light source is $\lambda 5$=408 nm, image side numerical aperture NA5=0.85, image formation magnification m5=0.0.

The surface Nos. 2, 3, 4 and 3 in Table 5 indicate the incident surface and the emergence surface of the aberration correcting element and the incident surface and the emergence surface of the objective lens. Further, Ri expresses the radius of curvature, di expresses a position in the optical axis 1 direction from the i-th surface to (i+1)-th surface, and ni expresses the refractive index of each surface.

The $4^{th}$ surface and $5^{th}$ surface are respectively formed into the aspheric surface which is axially symmetric around the optical axis L, regulated by the equation in which coefficients shown in Table 5 are substituted into the above-described equation (Eq-1).

Further, on the 2nd surface, $3^{rd}$ surface and $4^{th}$ surface, the first phase structure PS1 and the second phase structure PS2 and the diffractive structure PS3 are formed, respectively. Each of these structures is expressed by the optical path difference added to the transmission wavefront by this structure. Such an optical path difference is, when h (mm) is a height in the direction perpendicular to the optical axis, and $B_{2i}$ is an optical path difference function coefficient, expressed by the optical path difference function $\Phi(h)$ (mm) defined by substituting coefficients shown in Table 5 into the above-described Eq-2.

Hereupon, the first diffractive structure is formed into the structure in which the reference wavelength is 407 nm, and which is optimized so that the diffraction order of the diffracted light flux having the maximum diffraction efficiency in the diffracted light fluxes of the incident light flux of this wavelength 407 nm, is $10^{th}$ order, that is, optimized by the diffraction order of $10^{th}$ order.

Further, the second phase structure is formed into the structure in which the reference wavelength is 407 nm, and which is optimized so that the diffraction order of the diffracted light flux having the maximum diffraction efficiency in the diffracted light fluxes of the incident light flux of this wavelength 407 nm, is 5th order, that is, optimized by the diffraction order of 5th order.

Further, in the present example, it is regulated that the diffraction order of the diffracted light flux having the maximum diffraction efficiency in the diffracted light fluxes generated by receiving the diffractive action from the diffractive structure when the light flux with wavelength $\lambda 2$ passes the central area, is 5 (m=5), and the light flux with wavelength $\lambda 2$ does not receive diffractive action by the diffractive structure when the light flux with wavelength $\lambda 2$ passes the peripheral area.

Figure 17:
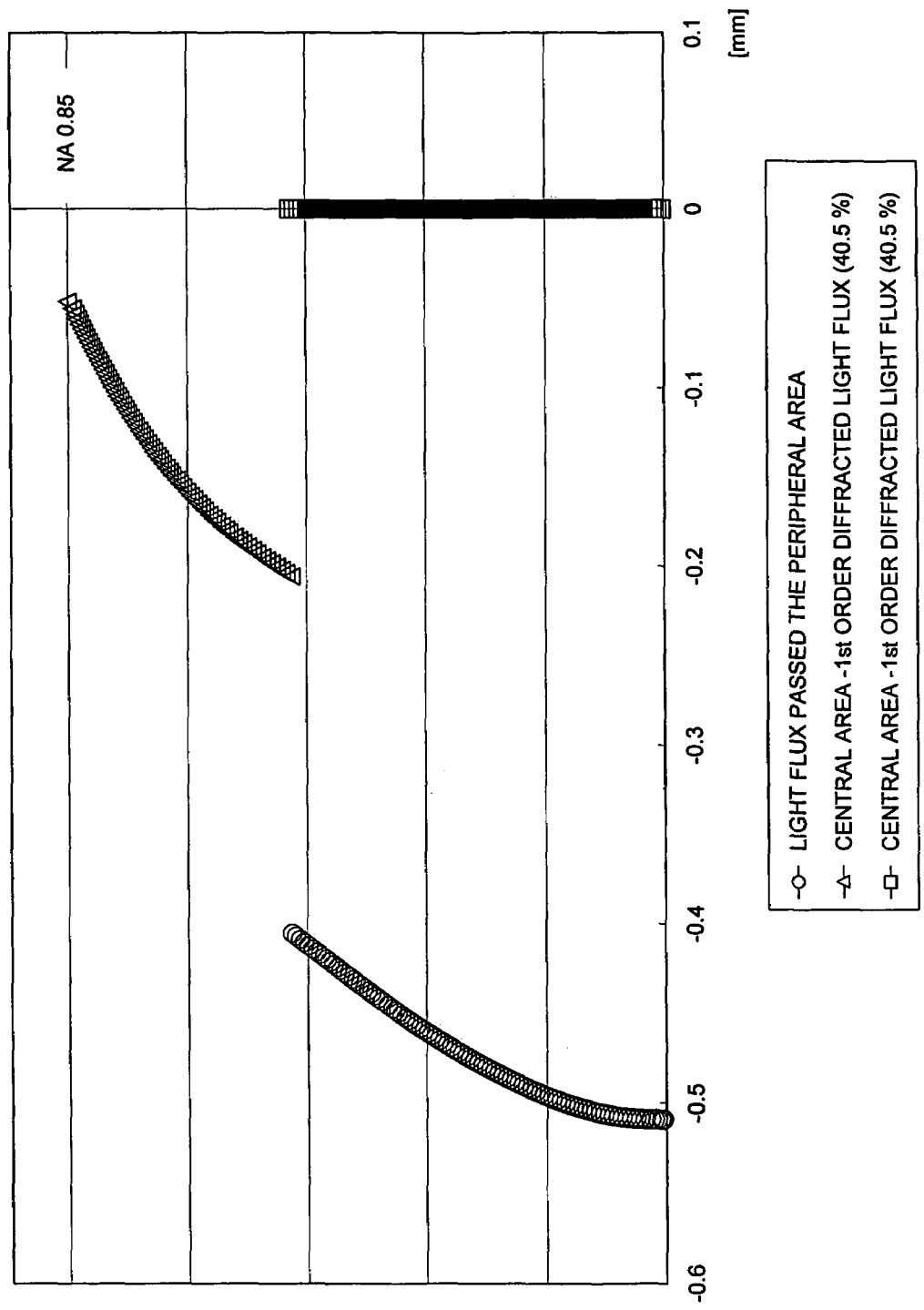
FIG. 17 is a vertical spherical aberration view.

FIG. 17 is a vertical spherical aberration view on the information recording surface of the virtually arranged fourth optical information recording medium. From FIG. 17, it is seen that the spherical aberration is suppressed to almost 0 within the range of effective diameter.

Figure 18:
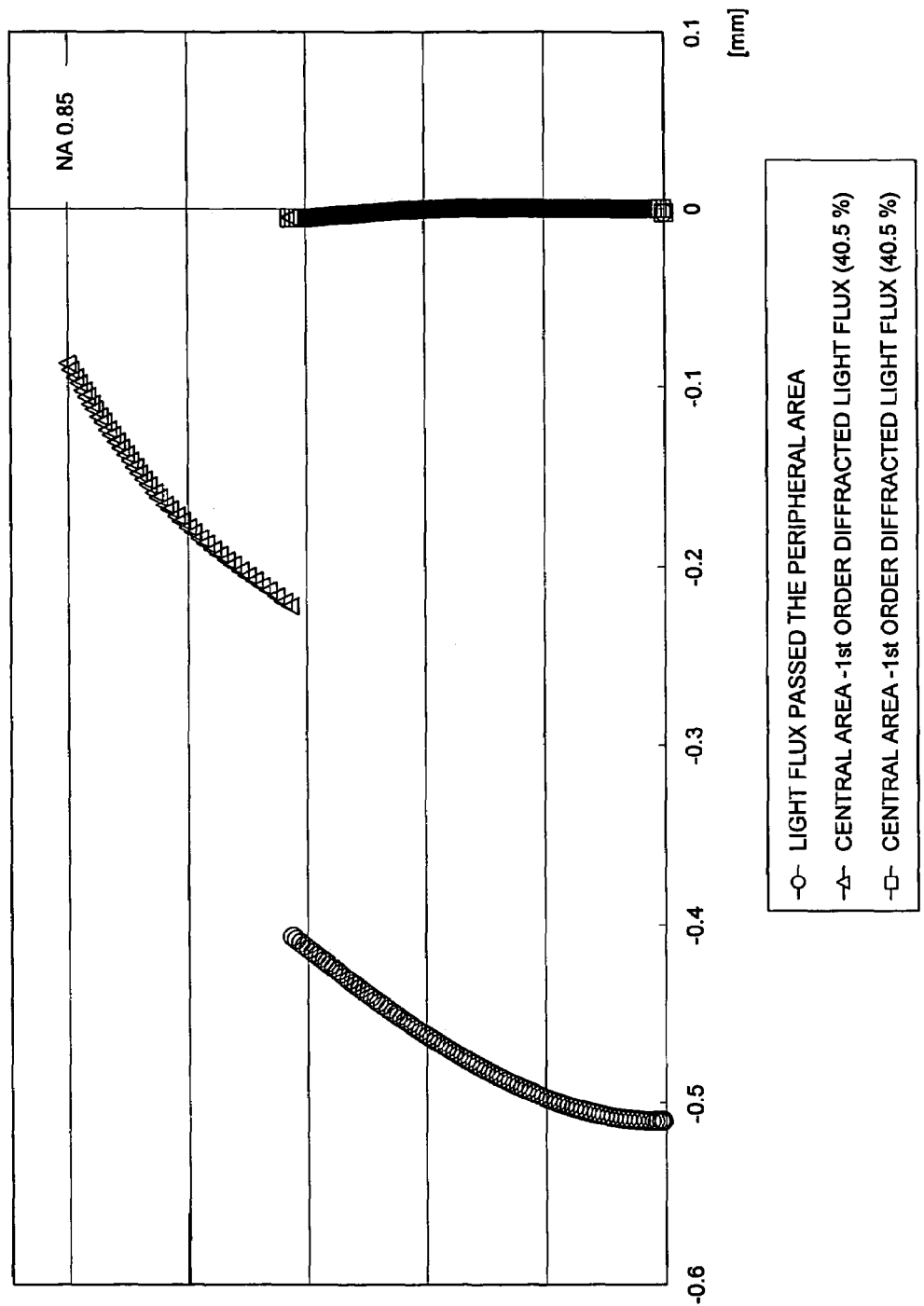
FIG. 18 is a vertical spherical aberration view.

FIG. 18 is a vertical spherical aberration view on the information recording surface of the new format optical disc (protective substrate thickness t2=0.9 mm. Further, FIG. 19 is a vertical spherical aberration view on the information recording surface of CD (protective substrate thickness t3=1.2 mm.

Figure 19:
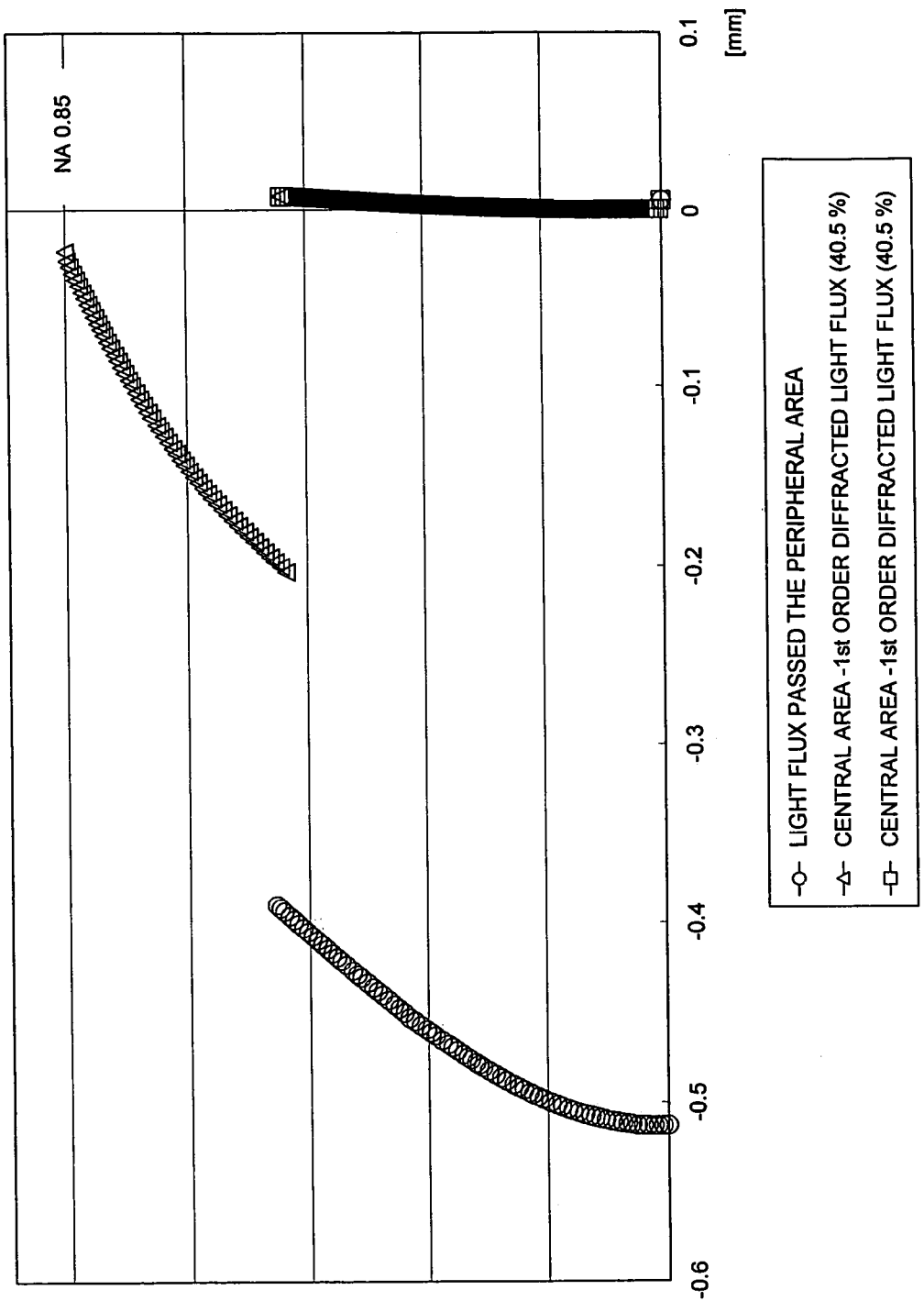
FIG. 19 is a vertical spherical aberration view.

From FIG. 18 and FIG. 19, it is seen that the light flux with wavelength $\lambda 2$ passed the central area is converged on the information recording surface of the new format optical disc and the information recording surface of CD, in the state that the wave-front aberration is not larger than 0.07 ($\lambda 2$ rms). Further, when it is set in such a manner that the light flux with wavelength $\lambda 2$ passed the peripheral area is, on the information recording surface of the new format optical disc and the information recording surface of CD, in the state that the wave-front aberration is not smaller than 0.15 ($\lambda 2$ rms) and the spherical aberration is discontinuous in the vicinity of the border between the central area and the peripheral area, the light flux with wavelength $\lambda 2$ passed the peripheral area is so-called flared, and is not used for the reproducing of the information on the new format optical disc and CD.

While the preferred embodiments of the present invention have been described using specific terms, such description is for illustrative purposes only, and it is to be understood that changes and variations may be made without departing from the sprit or scope of the appended claims.

What is claimed is:

1. An objective lens for use in an optical pickup apparatus for recording and/or reproducing information on a first optical information recording medium having a protective substrate with a thickness t1 using a light flux with a wavelength $\lambda 1$, for recording and/or reproducing information on a second optical information recording medium having a protective substrate with a thickness t2 (t1<t2) using a light flux with a wavelength $\lambda 2$ ($\lambda 1$<$\lambda 2$) and for recording and/or reproducing information on a third optical information recording medium having a protective substrate with a thickness t3 (t2<t3) using a light flux with the wavelength $\lambda 2$, the objective lens comprising:

an optical surface including a central area and a peripheral area arranged at an outside of the central area, wherein the central area transmits a light flux with the wavelength $\lambda 2$ used for reproducing or recording information on the second optical information recording medium or the third optical information recording medium and the peripheral area transmits a light flux with the wavelength λ2 not used for reproducing or recording information on the second optical information recording medium or the third optical information recording medium, the objective lens converges a light flux with the wavelength λ1 on an information recording surface of the first optical information recording medium, converges a light flux with the wavelength λ2 on an information recording surface of the second optical information recording medium, and converges a light flux with the wavelength λ2 on an information recording surface of the third optical information recording medium, and when the objective optical lens forms the light flux with the wavelength λ2 passing the central area into a converged spot through a substrate with a thickness t4 (t2<t4<t3), the objective optical lens makes a spherical aberration of the converged spot a minimum value, and the objective lens satisfies the following expressions:

$$0.60 \leq NA1 \leq 0.67$$

$$0.45 \leq NA2 \leq 0.55$$

where NA1 is a numerical aperture of image side of the objective lens which is necessary for information reproducing or recording on the first optical information recording medium, and NA2 is a numerical aperture of image side of the objective lens which is necessary for information reproducing or recording on the second optical information recording medium.

2. The objective lens of claim 1, wherein the central area comprises a first phase structure including a plurality of ring-shaped zones arranged concentrically around an optical axis, the peripheral area comprises a second phase structure including a plurality of ring-shaped zones arranged concentrically around the optical axis.

3. The objective lens of claim 2, wherein the first phase structure is a first diffractive structure, the second phase area is a second diffractive structure, the objective lens satisfies m≦n, where m is a diffraction order of a diffracted light flux having a maximum diffraction efficiency among diffracted light fluxes generated from a light flux with the wavelength λ2 passing through the first diffractive structure and n is a diffraction order of a diffracted light flux having a maximum diffraction efficiency among diffracted light fluxes generated from a light flux with the wavelength λ2 passing through the second diffractive structure, the central area and the peripheral area transmit a light flux with the wavelength λ1 and converges the light flux with the wavelength λ1 on the information recording surface of the first optical information recording medium with a wavefront aberration of 0.07 λ1 rms or less, the central area transmits a light flux with the wavelength λ2 and converges the light flux with the wavelength λ2 on the information recording surface of the second or third optical information recording media with a wavefront aberration of 0.07 λ2 rms or less, the peripheral area transmits a light flux with the wavelength λ2 and makes a wavefront aberration of the light flux with the wavelength λ2 on the information recording surface of the second or third optical information recording media 0.15 λ2 rms or more and makes the wavefront aberration discontinuous in the vicinity of the border between the central area and the peripheral area.

4. The objective lens of claim 3 satisfying m<n.

5. The objective lens of claim 2, wherein when p is a diffraction order of a diffracted light flux with a secondary highest diffraction efficiency next to the n order diffracted light flux among diffracted light fluxes generated from a light flux with the wavelength λ2 passing through the second diffractive structure, a diffraction efficiency in which the diffraction efficiency of the n order diffracted light flux and the diffraction efficiency of the p order diffracted light flux are added is 80% or more, and the objective lens converges the p order diffracted light flux on a paraxial position closer to a paraxial converging position on the information recording surface of the light flux with the wavelength λ2 passed the central area than a n-th order diffracted light flux.

6. The objective lens of claim 1, satisfying following expressions:

$$\lambda1 = 655 \pm 20 \text{ nm}$$

$$\lambda2 = 785 \pm 20 \text{ nm}$$

$$0.5 \text{ mm} \leq t1 \leq 0.7 \text{ mm}$$

$$0.8 \text{ mm} \leq t2 < 1.05 \text{ mm}$$

$$1.05 \text{ mm} \leq t3 \leq 1.3 \text{ mm}.$$

7. The objective lens of claim 6, satisfying following expressions:

$$\lambda1 < \lambda B1 < \lambda2$$

$$\lambda B2 = \lambda1$$

$$L1 = 1$$

$$3 \leq L2 \leq 5$$

where the first diffractive structure is optimized with a wavelength λB1 and diffraction order L1, and the second diffractive structure is optimized by a wavelength λB2 and diffraction order L2.

8. The objective lens of claim 1, wherein when the optical pickup apparatus records and/or reproduces information on a fifth optical information recording medium having a protective substrate with a thickness t5 (t5≦t1) using a light flux with a wavelength λ5 (λ5≦λ1), the objective lens converges the light flux with the wavelength λ5 on an information recording surface of the fifth optical information recording medium.

9. The objective lens of claim 8, wherein the central area comprises a first phase structure including a plurality of ring-shaped zones arranged concentrically around an optical axis, the peripheral area comprises a second phase structure including a plurality of ring-shaped zones arranged concentrically around the optical axis.

10. The objective lens of claim 9, wherein at least one of the first phase structure and the second phase structure is a diffractive structure.

11. The objective lens of claim 8,
wherein the central area and the peripheral area transmit a light flux with the wavelength $\lambda 5$ and converges the light flux with the wavelength $\lambda 5$ on the information recording surface of the fifth optical information recording medium with a wavefront aberration of 0.07 $\lambda 5$ rms or less,
the central area and the peripheral area transmit a light flux with the wavelength $\lambda 1$ and converges the light flux with the wavelength $\lambda 1$ on the information recording surface of the first optical information recording medium with a wavefront aberration of 0.07 $\lambda 1$ rms or less,
the central area transmits a light flux with the wavelength $\lambda 2$ and converges the light flux with the wavelength $\lambda 2$ on the information recording surface of the second or third optical information recording media with a wavefront aberration of 0.07 $\lambda 2$ rms or less,
the peripheral area transmits a light flux with the wavelength $\lambda 2$ and makes a wavefront aberration of the light flux with the wavelength $\lambda 2$ on the information recording surface of the second or third optical information recording media 0.15 $\lambda 2$ rms or more and makes the wavefront aberration discontinuous in the vicinity of the border between the central area and the peripheral area.

12. The objective lens of claim 8, satisfying following expressions:

$$0.60 \leq NA5 \leq 0.67$$

where NA5 is a numerical aperture of image side of the objective lens which is necessary for information reproducing or recording on the fifth optical information recording medium.

13. The objective lens of claim 8, satisfying following expressions:

$$\lambda 5 = 405 \pm 20 \text{ nm}$$

$$0.5 \text{ mm} \leq t5 \leq 0.7 \text{ mm}.$$

14. The objective lens of claim 8, satisfying following expressions:

$$0.80 \leq NA5 \leq 0.99$$

where NA5 is a numerical aperture of image side of the objective lens which is necessary for information reproducing or recording on the fifth optical information recording medium.

15. The objective lens of claim 8, satisfying following expressions:

$$\lambda 5 = 405 \pm 20 \text{ nm}$$

$$0.0 \text{ mm} \leq t5 \leq 0.3 \text{ mm}.$$

16. The objective lens of claim 1, satisfying following expressions:

$$\frac{t2 + t3}{2} - 0.2 < t4 < \frac{t2 + t3}{2} + 0.1$$

$$t3 - t2 < 0.5.$$

17. An optical pickup apparatus comprising:
a first light source for emitting a light flux with a wavelength $\lambda 1$ recording and/or reproducing information on a first optical information recording medium having a protective substrate with a thickness t1;
a second light source for emitting a light flux with a wavelength $\lambda 2$ ($\lambda 1 \leq \lambda 2$) recording and/or reproducing information on a second optical information recording medium having a protective substrate with a thickness t2 (t1<t2) and a third optical information recording medium having a protective substrate with a thickness t3; and
the objective lens of claim 1.

* * * * *

UNITED STATES PATENT AND TRADEMARK OFFICE
CERTIFICATE OF CORRECTION

| | | |
|---|---|---|
| PATENT NO. | : 7,664,003 B2 | Page 1 of 1 |
| APPLICATION NO. | : 11/168919 | |
| DATED | : February 16, 2010 | |
| INVENTOR(S) | : Kenji Ogiwara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Twenty-eighth Day of December, 2010

David J. Kappos
*Director of the United States Patent and Trademark Office*